US012674384B2

(12) United States Patent
Abbas et al.

(10) Patent No.:  US 12,674,384 B2
(45) Date of Patent:  Jul. 7, 2026

(54) HYDRAULIC FRACTURING FRAMEWORK

(71) Applicant: Schlumberger Technology Corporation, Sugar Land, TX (US)

(72) Inventors: Safdar Abbas, Sugar Land, TX (US); Adrian Enrique Rodriguez Herrera, London (GB); Karsten Fischer, Aachen (DE)

(73) Assignee: Schlumberger Technology Corporation, Sugar Land, TX (US)

( * ) Notice: Subject to any disclaimer, the term of this patent is extended or adjusted under 35 U.S.C. 154(b) by 394 days.

(21) Appl. No.: 18/499,821

(22) Filed: Nov. 1, 2023

(65) Prior Publication Data

US 2024/0141774 A1     May 2, 2024

Related U.S. Application Data

(60) Provisional application No. 63/421,777, filed on Nov. 2, 2022.

(51) Int. Cl.
| | |
|---|---|
| *E21B 47/005* | (2012.01) |
| *E21B 43/26* | (2006.01) |
| *E21B 49/00* | (2006.01) |
| *G01V 1/44* | (2006.01) |
| *G01V 20/00* | (2024.01) |

(52) U.S. Cl.
CPC ............ *E21B 47/005* (2020.05); *E21B 43/26* (2013.01); *G01V 1/44* (2013.01); *G01V 20/00* (2024.01); *E21B 49/006* (2013.01); *E21B 2200/20* (2020.05); *G01V 2210/646* (2013.01)

(58) Field of Classification Search
CPC .... E21B 47/005; E21B 43/26; E21B 2200/20; E21B 49/006; G01V 20/00; G01V 1/44; G01V 2210/646
See application file for complete search history.

(56) References Cited

U.S. PATENT DOCUMENTS

| | | | |
|---|---|---|---|
| 11,175,434 B2 | 11/2021 | Laverne | |
| 2009/0248374 A1 | 10/2009 | Huang et al. | |
| 2017/0075006 A1* | 3/2017 | Dusterhoft ............. | G01V 1/303 |
| 2018/0113235 A1* | 4/2018 | Laverne ................. | G01V 20/00 |
| 2020/0309982 A1* | 10/2020 | Jin ........................... | G01V 1/50 |

OTHER PUBLICATIONS

Zhang, Zhishuai, et al. "Modeling of Fiber-Optic Strain Responses to Hydraulic Fracturing." Geophysics, vol. 85, No. 6, Nov. 1, 2020, pp. A45-A50, https://doi.org/10.1190/geo2020-0083.1. Accessed Apr. 16, 2024. (Year: 2020).*
Jin, Ge, and Baishali Roy. "Hydraulic-Fracture Geometry Characterization Using Low-Frequency DAS Signal." The Leading Edge, vol. 36, No. 12, Dec. 2017, pp. 975-980, https://doi.org/10.1190/tle36120975.1. Accessed Nov. 14, 2022. (Year: 2017).*

* cited by examiner

*Primary Examiner* — Alexander Satanovsky
*Assistant Examiner* — Logan D Coons
(74) *Attorney, Agent, or Firm* — Kyle R. Miiller

(57) ABSTRACT

A method can include receiving strain data associated with propagation of a hydraulic fracture in a subsurface geologic region; performing a comparison between the strain data and simulation results generated using a mesh model of the subsurface geologic region and enrichment equations that represent one or more discontinuities in the subsurface geologic region; and, based on the comparison, characterizing the subsurface geologic region.

20 Claims, 19 Drawing Sheets

System 100

System 200

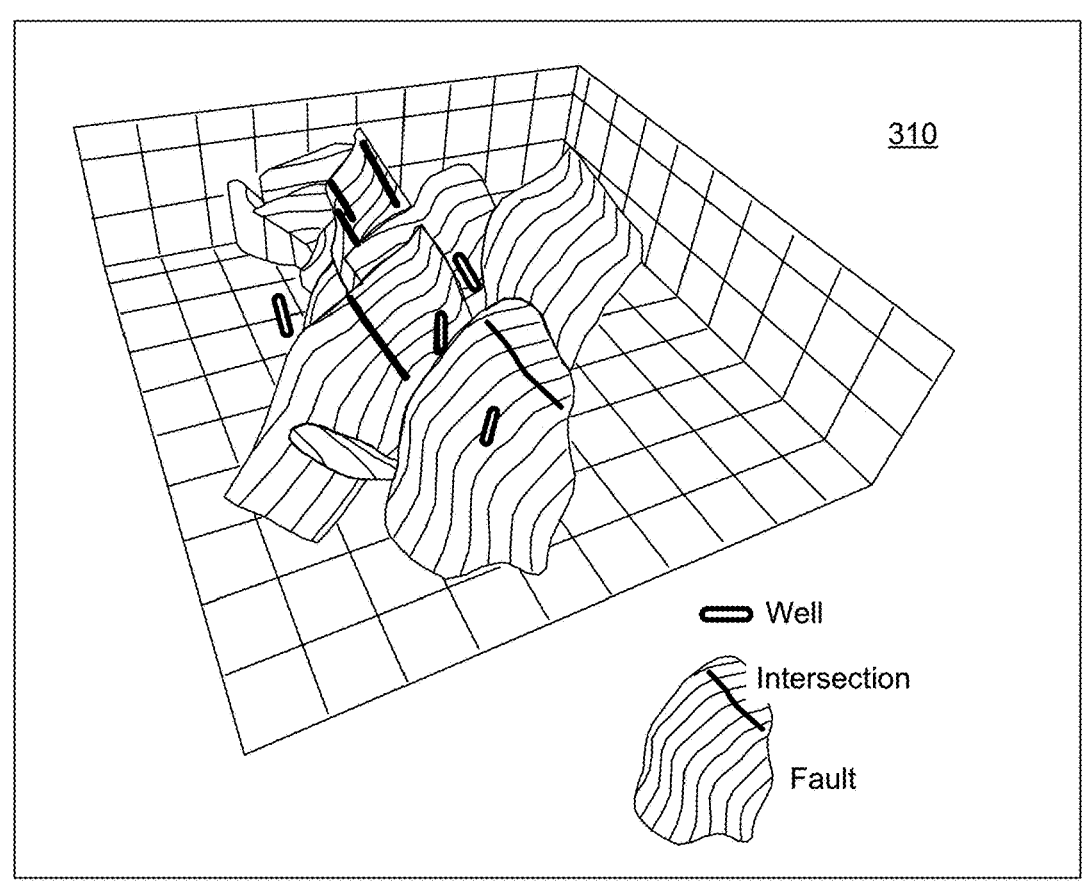
310
⬯ Well
— Intersection
Fault
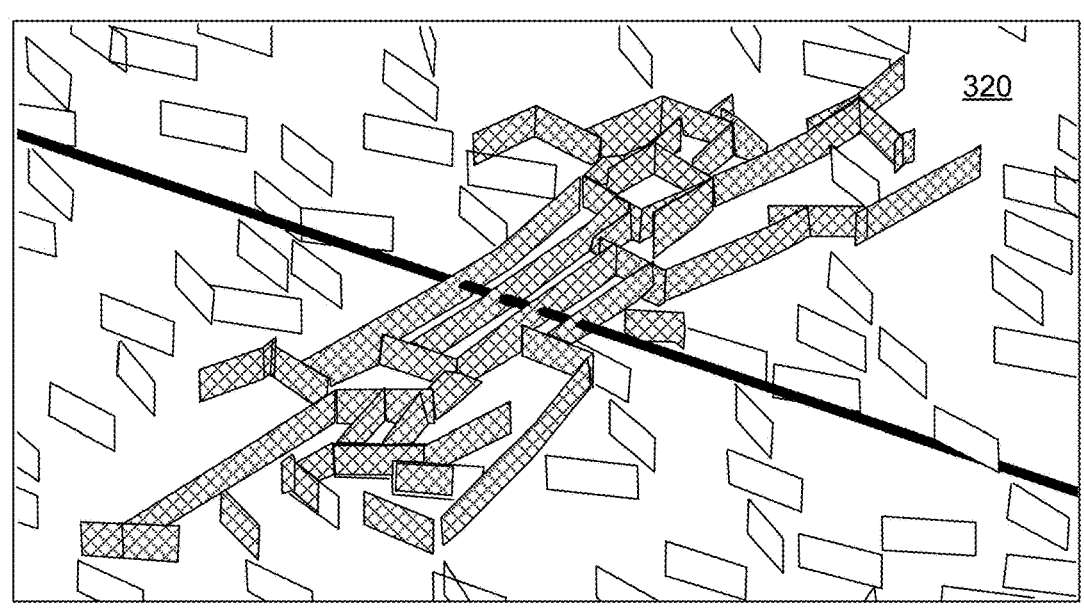
320
FIG. 3

$$u(x) = \sum_i u_i \phi_i(x)$$

802

810

816

812

814

$$u(x) = \sum_i u_i \phi_i(x) + \sum_j b_j \phi_j(x) H(x)$$

$$u(x) = \sum_i u_i \phi_i(x) + \sum_j b_j \phi_j(x) H(x)$$

$$+ \sum_k \phi_k(x) \left( \sum_{\ell=1}^{4} c_k^\ell F_\ell(r(x), \theta(x)) \right)$$

$$\{F_\ell(r,\theta)\} := \left\{ \sqrt{r} \sin\left(\frac{\theta}{2}\right), \sqrt{r} \cos\left(\frac{\theta}{2}\right), \sqrt{r} \sin\left(\frac{\theta}{2}\right) \sin(\theta), \sqrt{r} \cos\left(\frac{\theta}{2}\right) \sin(\theta) \right\}$$

FIG. 9

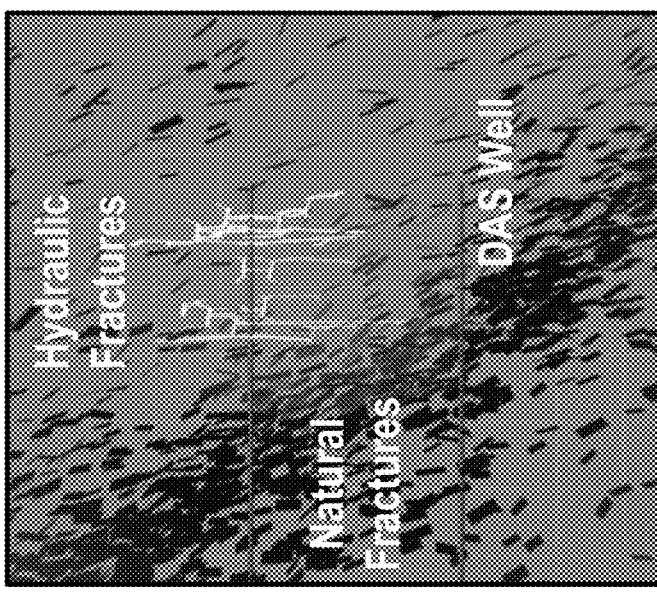
1100
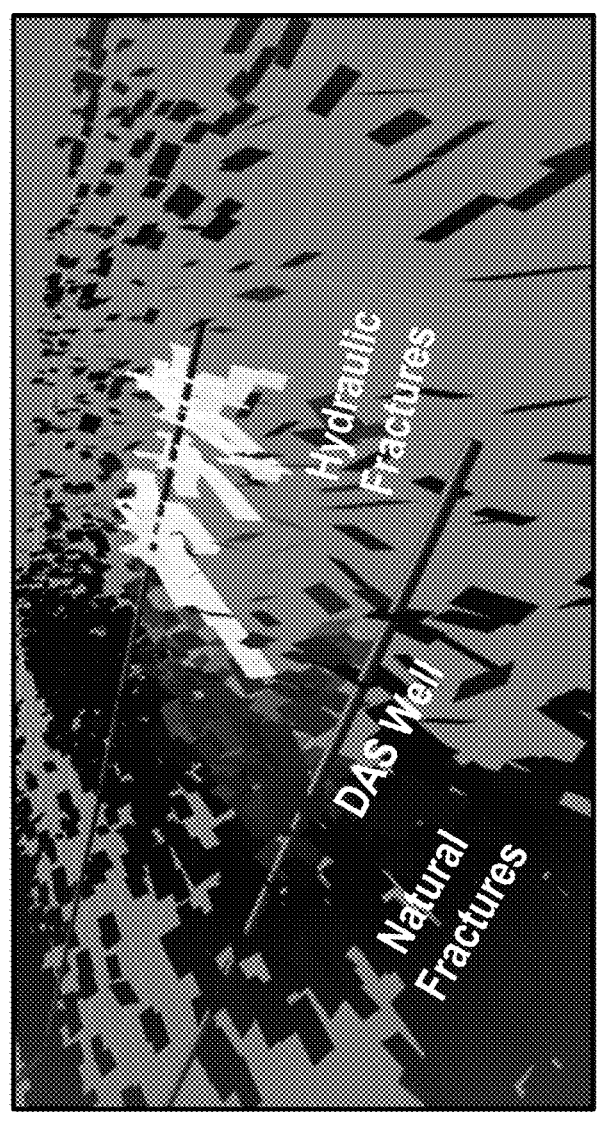
FIG. 11

1500
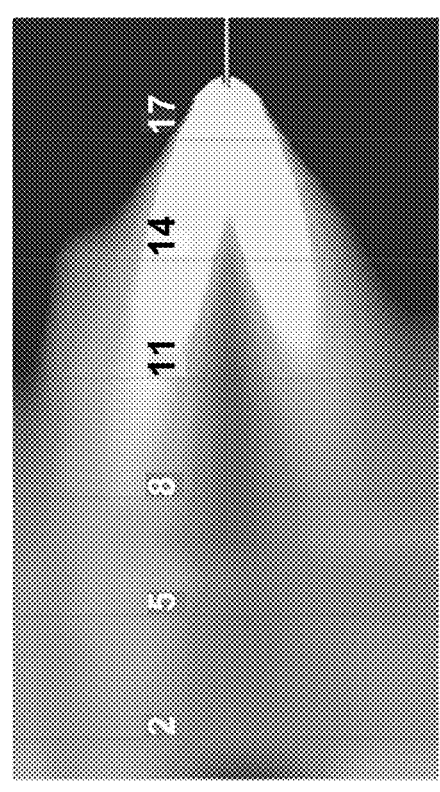
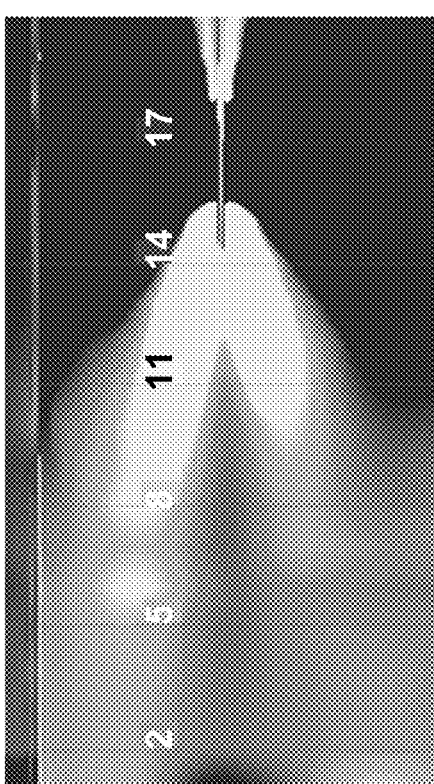
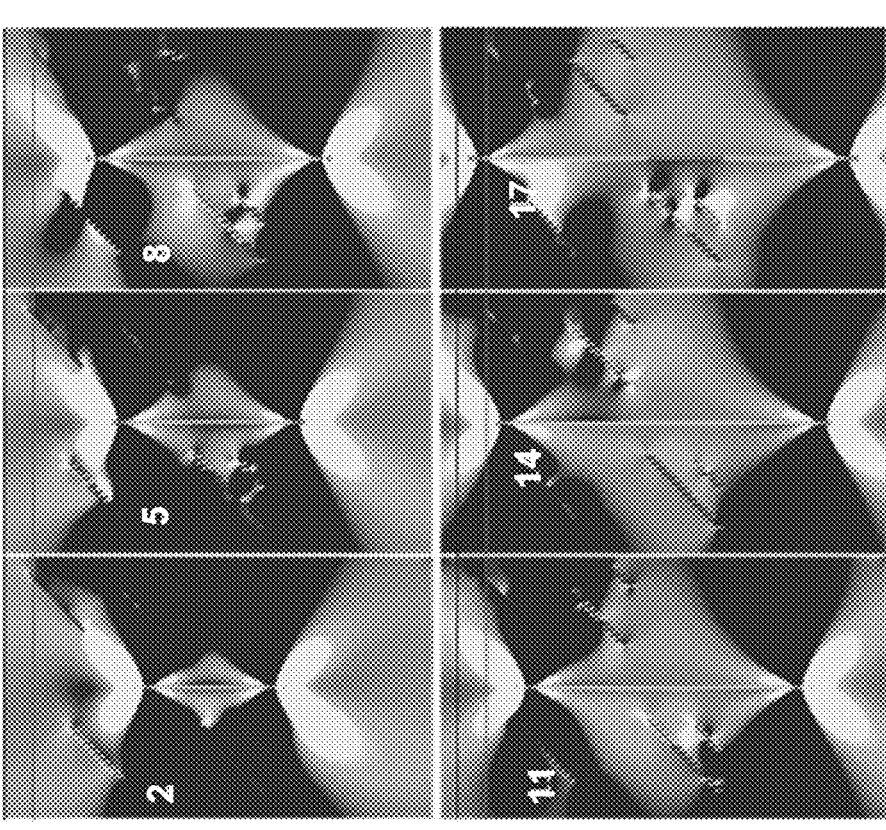
Time
FIG. 15

Method <u>1700</u>

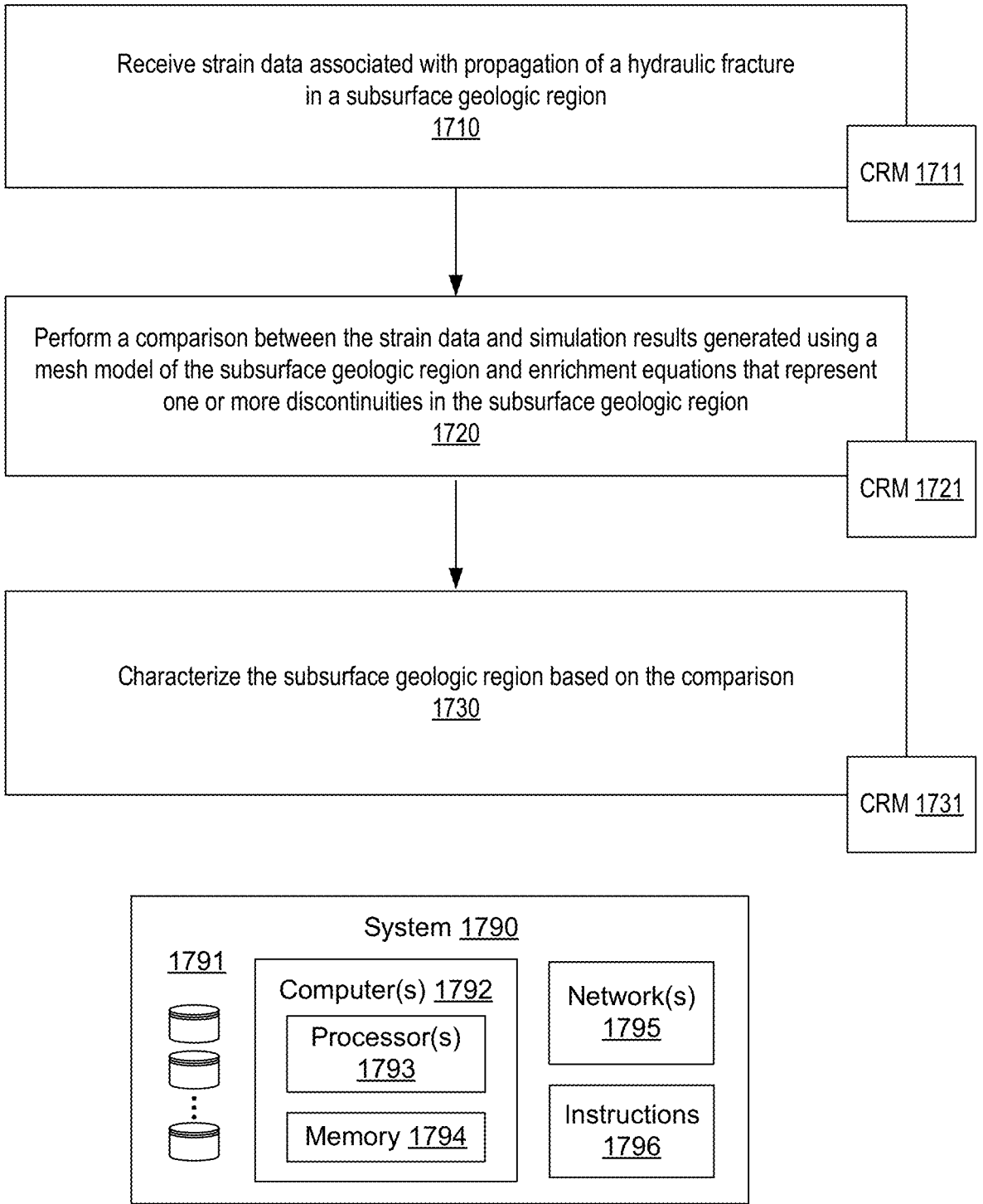

Receive strain data associated with propagation of a hydraulic fracture
in a subsurface geologic region
<u>1710</u>

CRM <u>1711</u>

Perform a comparison between the strain data and simulation results generated using a
mesh model of the subsurface geologic region and enrichment equations that represent
one or more discontinuities in the subsurface geologic region
<u>1720</u>

CRM <u>1721</u>

Characterize the subsurface geologic region based on the comparison
<u>1730</u>

CRM <u>1731</u>

System <u>1790</u>

<u>1791</u>

Computer(s) <u>1792</u>

Processor(s)
<u>1793</u>

Memory <u>1794</u>

Network(s)
<u>1795</u>

Instructions
<u>1796</u>

Fig. 17

Method 1800

1900

HYDRAULIC FRACTURING FRAMEWORK

RELATED APPLICATION

This application claims priority to and the benefit of a U.S. Provisional Application having Ser. No. 63/421,777, filed 2 Nov. 2022, which is incorporated by reference herein in its entirety.

BACKGROUND

Phenomena associated with a sedimentary basin may be modeled using a mesh, a grid, etc. As an example, a structural model may be created based on data associated with a sedimentary basin. For example, where a basin includes various types of features (e.g., stratigraphic layers, faults, etc.), data associated with such features may be used to create a structural model of the basin. Such a model may be a basis for analysis, further modeling, etc.

However, uncertainty can exist for various subsurface features in a subsurface geologic region. For example, position of a fracture as modeled by a mesh may be uncertain. In such an example, upon acquisition of data, the position of the fracture may be known with greater certainty such that the mesh can be revised to more accurately represent the fracture. Unfortunately, revision of a mesh can be a complex task as it can involve moving mesh nodes, introducing new mesh nodes, adjusting sizes of mesh elements defined by nodes, introducing new mesh elements, etc. Such revisions can alter matrix structures, which may lead to issues during simulation of physical phenomena. For example, a matrix condition number may be increased such that a matrix becomes ill-conditioned. An ill-conditioned matrix can lead to convergence issues such that a computational simulator does not converge to a solution or converges to a solution more slowly (e.g., demanding more time).

Various technologies, techniques, etc., described herein pertain to structural modeling, structural models, etc., that can be integrated into a workflow where certain types of features can be modeled without adjusting a mesh, a grid, etc. Such an approach can improve handling of uncertainty and expedite a workflow, which may be a workflow that includes data acquisition, subsurface characterization, control, etc., during one or more field operations.

SUMMARY

A method can include receiving strain data associated with propagation of a hydraulic fracture in a subsurface geologic region; performing a comparison between the strain data and simulation results generated using a mesh model of the subsurface geologic region and enrichment equations that represent one or more discontinuities in the subsurface geologic region; and, based on the comparison, characterizing the subsurface geologic region.

A system can include a processor; a memory operatively coupled to the processor; processor-executable instructions stored in the memory and executable to instruct the system to: receive strain data associated with propagation of a hydraulic fracture in a subsurface geologic region; perform a comparison between the strain data and simulation results generated using a mesh model of the subsurface geologic region and enrichment equations that represent one or more discontinuities in the subsurface geologic region; and, based on the comparison, characterize the subsurface geologic region.

One or more computer-readable storage media can include processor-executable instructions executable by a system to instruct the system to: receive strain data associated with propagation of a hydraulic fracture in a subsurface geologic region; perform a comparison between the strain data and simulation results generated using a mesh model of the subsurface geologic region and enrichment equations that represent one or more discontinuities in the subsurface geologic region; and, based on the comparison, characterize the subsurface geologic region.

Various other apparatuses, systems, methods, etc., are also disclosed. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 3 illustrates examples of subsurface geologic regions;

FIG. 9 illustrates an example of a mesh and examples of equations;

FIG. 11 illustrates examples of subsurface geologic regions;

FIG. 15 illustrates examples of simulation results;

FIG. 17 illustrates an example of a method and an example of a system;

DETAILED DESCRIPTION

Figure 1:
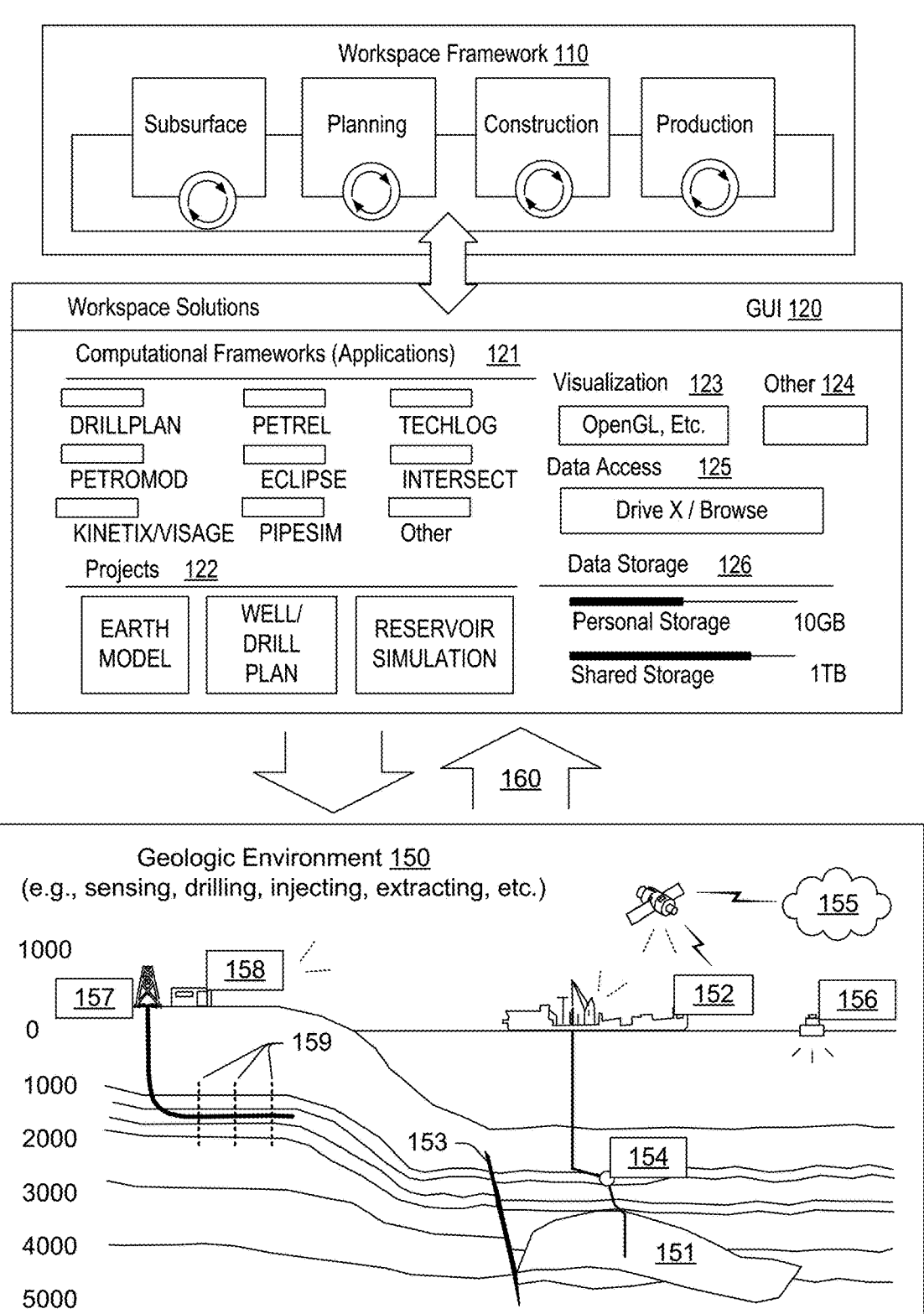
FIG. 1 illustrates an example system that includes various components for simulating a geological environment.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As explained, re-meshing (e.g., or re-gridding) a mesh (e.g., or a grid) to address uncertainty as to one or more subsurface features can be time consuming and may introduce issues when using numerical techniques to simulate one or more physical phenomena. As to the terms "grid" and "mesh", these terms may be used interchangeably, where, in general, they depend on nodes, which can be defined as points in space. Such nodes can define elements that can be referred to as cells (e.g., grid cells, mesh cells, etc.).

As explained, phenomena associated with a sedimentary basin (e.g., a subsurface region, whether below a ground surface, water surface, etc.) may be modeled using a model or models. As an example, a structural model of a basin may find use for understanding various processes related to exploration and production of natural resources (estimating reserves in place, drilling wells, forecasting production, etc.). As an example, a structural model may be used as a basis for building a model for use with a numerical technique.

For application of a numerical technique, equations may be discretized using a grid that includes nodes, cells, etc. To represent features in a geologic environment, a structural model may assist with properly locating nodes, cells, etc. of a grid for use in simulation using one or more numerical techniques.

As to numerical techniques, a numerical technique such as the finite difference method can include discretizing a 1D differential heat equation for temperature with respect to a spatial coordinate to approximate temperature derivatives (e.g., first order, second order, etc.). Where time is of interest, a derivative of temperature with respect to time may also be provided. As to the spatial coordinate, the numerical technique may rely on a spatial grid that includes various nodes where a temperature will be provided for each node upon solving the heat equation (e.g., subject to boundary conditions, generation terms, etc.). Such an example may apply to multiple dimensions in space (e.g., where discretization is applied to the multiple dimensions). Thus, a grid may discretize a volume of interest (VOI) into elementary elements (e.g., cells or grid blocks) that may be assigned or associated with properties (e.g. porosity, rock type, etc.), which may be germane to simulation of physical processes (e.g., fluid flow, reservoir compaction, etc.).

As another example of a numerical technique, consider the finite element method where space may be represented by one dimensional or multi-dimensional "elements". For one spatial dimension, an element may be represented by two nodes positioned along a spatial coordinate. For multiple spatial dimensions, an element may include any number of nodes. Further, some equations may be represented by certain nodes while others are represented by fewer nodes (e.g., consider an example for the Navier-Stokes equations where fewer nodes represent pressure). The finite element method may include providing nodes that can define triangular elements (e.g., tetrahedra in 3D, higher order simplexes in multidimensional spaces, etc.) or quadrilateral elements (e.g., hexahedra or pyramids in 3D, etc.), or polygonal elements (e.g., prisms in 3D, etc.). Such elements, as defined by corresponding nodes of a grid, may be referred to as grid cells.

Yet another example of a numerical technique is the finite volume method. For the finite volume method, values for model equation variables may be calculated at discrete places on a grid, for example, a node of the grid that includes a "finite volume" surrounding it. The finite volume method may apply the divergence theorem for evaluation of fluxes at surfaces of each finite volume such that flux entering a given finite volume equals that leaving to one or more adjacent finite volumes (e.g., to adhere to conservation laws). For the finite volume method, nodes of a grid may define grid cells.

As an example, a model may represent a stratigraphic sequence where a sedimentary basin may include sedimentary deposits grouped into stratigraphic units, for example, based on any of a variety of factors, to approximate or represent time lines that place stratigraphy in a chronostratigraphic framework. While sequence stratigraphy is mentioned, lithostratigraphy may be applied, for example, based on similarity of lithology of rock units (e.g., rather than time-related factors).

As an example, a mesh may conform to structural features such as, for example, low-angle unconformities, salt bodies, intrusions, fractures, etc. (e.g., geological discontinuities), to more fully capture complexity of a geological model. As an example, a mesh may optionally conform to stratigraphy (e.g., in addition to one or more geological discontinuities). As to geological discontinuities, these may include model discontinuities such as one or more model boundaries. As an example, a mesh may be populated with property fields generated, for example, by geostatistical methods.

In general, a relationship may exist between node spacing and phenomenon or phenomena being modeled. Various scales may exist within a geologic environment, for example, a molecular scale may be on the order of approximately $10^{-9}$ to approximately $10^{-8}$ meters, a pore scale may be on the order of approximately $10^{-6}$ to approximately $10^{-3}$ meters, bulk continuum may be on the order of approximately $10^{-3}$ to approximately $10^{-2}$ meters, and a basin scale on the order of approximately $10^3$ to approximately $10^5$ meters. As an example, nodes of a mesh may be selected based at least in part on the type of phenomenon or phenomena being modeled (e.g., to select nodes of appropriate spacing or spacings). As an example, nodes of a grid may include node-to-node spacing of about 10 meters to about 500 meters. In such an example, a basin being modeled may span, for example, over approximately $10^3$ meters. As an example, node-to-node space may vary, for example, being smaller or larger than the aforementioned spacings.

Some data may be involved in building an initial mesh and, thereafter, a model, a corresponding mesh, etc. may optionally be updated in response to model output, changes in time, physical phenomena, additional data, etc. Data may include, for example, one or more of the following: depth or thickness maps and fault geometries and timing from seismic, remote-sensing, electromagnetic, gravity, outcrop, well log data, microseismic sensing, etc. Furthermore, data may include depth and thickness maps stemming from facies variations.

As explained, in various instances, subsurface geologic features may be uncertain. For example, position, orientation, extent, etc., of a fracture may be uncertain. Where a subsurface geologic region includes a number of fractures, uncertainty may be increased. Where a mesh is utilized to model physical phenomena in a subsurface geologic region, uncertainty as to features represented by the mesh can lead to inaccurate results. For example, simulation results for a modeled geologic region may not match acquired field data. To address a mismatch, the acquired field data may be utilized to update the mesh; however, as mentioned, re-meshing can be a time-consuming process that may lead to simulation issues.

As an example, a framework can provide for updating a mesh based on acquired data without altering positions of mesh nodes. In such an example, the framework may implement jump equations, which may be referred to as enrichment equations. Such types of equations are utilized in the Extended Finite Element Method (XFEM). As an example, a framework can provide for introducing, moving, re-shaping, re-sizing, etc., one or more types of discontinuities in a model without having to alter mesh nodes. Such an approach can reduce pre-processing demands as associated with mesh alteration.

The XFEM can include so-called "jump" functions where such functions may account for discontinuities. As an example, a discontinuity may be classified as a type of discontinuity. For example, consider discontinuity classified as a weak discontinuity or as a strong discontinuity. A weak discontinuity may be a type of discontinuity associated with a jump in a gradient of a solution. In such an example, an enrichment function may be chosen such as the abs-function. For a strong discontinuity, a jump may be present in a solution. In such an example, an enrichment function may be choses such as the sign-function or the Heaviside function. The Heaviside function (e.g., a unit step function), which may be denoted by H, is a discontinuous function. For example, for negative arguments, the value of the Heaviside function can be set to zero and, for positive arguments, the value of the Heaviside function can be set to unity (e.g., or vice-versa, etc.).

As explained in various examples herein, a mesh can utilize enrichment functions to represent fractures in a subsurface geologic environment where field data can be acquired during hydraulic fracturing and compared to simulation results generated using the mesh with the associated enrichment functions. As an example, enrichment functions can be updated based on at least a portion of field data such that a mesh and associated enrichment functions can more accurately match field data. In such an example, a subsurface environment may become more accurately modeled and understood.

As an example, a method may provide for real-time assessment of hydraulic fracturing where field data are compared to model-based results. For example, consider a pattern matching approach where the model-based results can be generated using a suitable number of realizations of a subsurface environment that can be expeditiously generated via a mesh and enrichment function approach, for example, optionally where each realization utilizes a common base mesh but with different sets of enrichment functions that describe different realizations of fractures in the subsurface environment.

As to types of field data that may be utilized, consider Distributed Acoustic Sensing (DAS). DAS can provide for acquiring data for monitoring operations and fracture growth. Such an approach may utilize so-called low-frequency DAS. A DAS system can include fiber optic cables to sense strain distributions and changes in strain. A DAS system can be utilized to detect strain signals over relatively large distances and in harsh environments such as downhole in wells of unconventional plays. As an example, a DAS fiber optic cable may be positioned in a cement layer surrounding a casing in a well such that the DAS fiber optic cable tends to be quite sensitive to axial strain changes along the well.

Below, various types of environments, frameworks, workflows, data acquisition techniques, etc., are described, which may involve use of mesh and enrichment function modeling and/or strain acquisition, optionally during one or more field operations (e.g., hydraulic fracturing, etc.).

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. A geologic environment 150 may be outfitted with a variety of sensors, detectors, actuators, etc. In such an environment, various types of equipment such as, for example, equipment 152 may include communication circuitry to receive and to transmit information, optionally with respect to one or more networks 155. Such information may include information associated with downhole equipment 154, which may be equipment to acquire information, to assist with resource recovery, etc. Other equipment 156 may be located remote from a wellsite and include sensing, detecting, emitting, or other circuitry. Such equipment may include storage and communication circuitry to store and to communicate data, instructions, etc. One or more satellites may be provided for purposes of communications, data acquisition, etc. For example, FIG. 1 shows a satellite 170 in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc., may exist where an assessment of such variations may assist with planning, operations, etc., to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, INTERSECT, KINETIX/VISAGE, and PIPESIM frameworks (SLB, Houston, Texas). One or more types of frameworks may be implemented within or in a manner operatively coupled to the DELFI environment, which is a secure, cognitive, cloud-based collaborative environment that integrates data and workflows with digital technologies, such as artificial intelligence (AI) and machine learning (ML). Such an environment can provide for operations that involve one or more frameworks. The DELFI environment may be referred to as the DELFI framework, which may be a framework of frameworks. The DELFI environment can include various other frameworks, which may operate using one or more types of models (e.g., simulation models, etc.).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive exploration and production (E & P) environment (SLB, Houston, Texas, referred to as the DELFI environment) for utilization in geosciences and geoengineering, for example, to analyze subsurface data from exploration to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator with numerical solvers for prediction of dynamic behavior for various types of reservoirs and development schemes.

The INTERSECT framework provides a high-resolution reservoir simulator for simulation of geological features and quantification of uncertainties, for example, by creating production scenarios and, with the integration of precise models of the surface facilities and field operations, the INTERSECT framework can produce results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI environment, for example, for rapid simulation of multiple concurrent cases.

The KINETIX framework provides for reservoir-centric stimulation-to-production analyses that can integrate geology, petrophysics, completion engineering, reservoir engineering, and geomechanics, for example, to provide for optimized completion and fracturing designs for a well, a pad, or a field. The KINETIX framework can be operatively coupled to and/or integrated with features of the PETREL framework (e.g., within the DELFI environment). As to the VISAGE framework it can be part of or otherwise operatively coupled to the KINETIX framework.

The VISAGE framework includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, CO2 disposal, etc.

As an example, the KINETIX framework can provide for analyses from 1D logs and simple geometric completions to 3D mechanical and petrophysical models coupled with the INTERSECT framework high-resolution reservoir simulator and VISAGE framework finite-element geomechanics simulator. The KINETIX framework can provide automated parallel processing using cloud platform resources and can provide for rapid assessment of well spacing, completion, and treatment design choices, enabling exploration of many scenarios in a relatively rapid manner (e.g., via provisioning of cloud platform resources). The KINETIX framework may be operatively coupled to the MANGROVE simulator (SLB, Houston, Texas), which can provide for optimization of stimulation design (e.g., stimulation treatment operations such as hydraulic fracturing) in a reservoir-centric environment.

The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (SLB, Houston Texas). The PIPESIM simulator may be an optimizer that can optimize one or more operational scenarios at least in part via simulation of physical phenomena.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150, and feedback 160 can be received via one or more interfaces in one or more forms (e.g., acquired data as to operational conditions, equipment conditions, environment conditions, etc.).

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

Visualization features may provide for visualization of various earth models, properties, etc., in one or more dimensions. As an example, visualization features may include one or more control features for control of equipment, which can include, for example, field equipment that can perform one or more field operations. A workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.). Field acquisition equipment may be utilized to acquire seismic data, which may be in the form of traces where a trace can include values organized with respect to time and/or depth (e.g., consider 1D, 2D, 3D or 4D seismic data).

A model may be a simulated version of a geologic environment where a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

While several simulators are illustrated in the example of FIG. 1, one or more other simulators may be utilized, additionally or alternatively.

Figure 2:
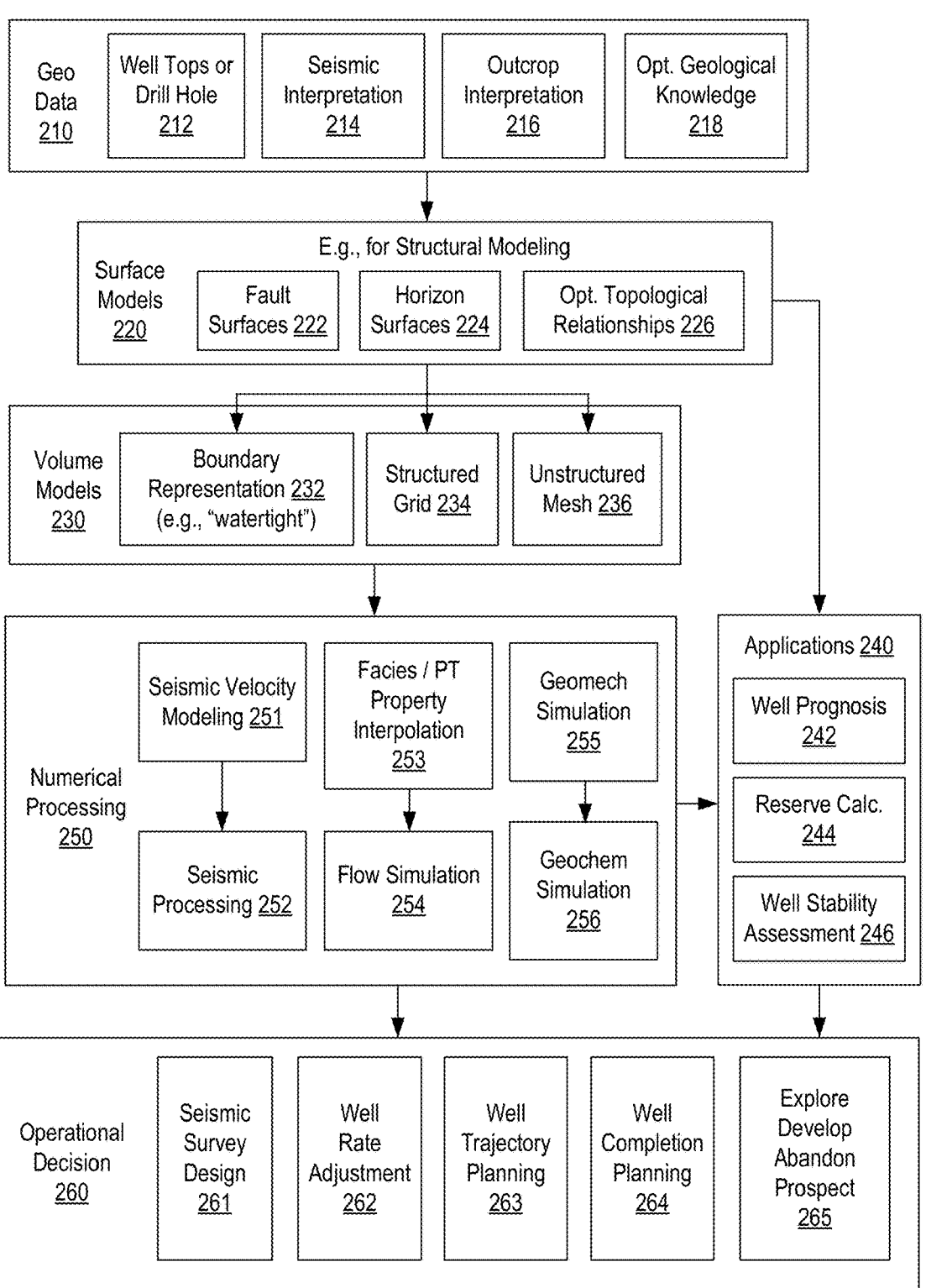
FIG. 2 illustrates an example of a system.

FIG. 2 shows an example of a system 200 that can be operatively coupled to one or more databases, data streams, etc. For example, one or more pieces of field equipment, laboratory equipment, computing equipment (e.g., local and/or remote), etc., can provide and/or generate data that may be utilized in the system 200.

As shown, the system 200 can include a geological/geophysical data block 210, a surface models block 220 (e.g., for one or more structural models), a volume models block 230, an applications block 240, a numerical processing block 250 and an operational decision block 260. As shown in the example of FIG. 2, the geological/geophysical data block 210 can include data from well tops or drill holes 212, data from seismic interpretation 214, data from outcrop interpretation and optionally data from geological knowledge. As an example, the geological/geophysical data block 210 can include data from digital images, which can include digital images of cores, cuttings, cavings, outcrops, etc. As to the surface models block 220, it may provide for creation, editing, etc. of one or more surface models based on, for example, one or more of fault surfaces 222, horizon surfaces 224 and optionally topological relationships 226. As to the volume models block 230, it may provide for creation, editing, etc. of one or more volume models based on, for example, one or more of boundary representations 232 (e.g., to form a watertight model), structured grids 234 and unstructured meshes 236.

As shown in the example of FIG. 2, the system 200 may allow for implementing one or more workflows, for example, where data of the data block 210 are used to create, edit, etc. one or more surface models of the surface models block 220, which may be used to create, edit, etc. one or more volume models of the volume models block 230. As indicated in the example of FIG. 2, the surface models block 220 may provide one or more structural models, which may be input to the applications block 240. For example, such a structural model may be provided to one or more applications, optionally without performing one or more processes of the volume models block 230 (e.g., for purposes of numerical processing by the numerical processing block 250). Accordingly, the system 200 may be suitable for one or more workflows for structural modeling (e.g., optionally without performing numerical processing per the numerical processing block 250).

As to the applications block 240, it may include applications such as a well prognosis application 242, a reserve calculation application 244 and a well stability assessment application 246. As to the numerical processing block 250, it may include a process for seismic velocity modeling 251 followed by seismic processing 252, a process for facies and petrophysical property interpolation 253 followed by flow simulation 254, and a process for geomechanical simulation 255 followed by geochemical simulation 256. As indicated, as an example, a workflow may proceed from the volume models block 230 to the numerical processing block 250 and then to the applications block 240 and/or to the operational decision block 260. As another example, a workflow may proceed from the surface models block 220 to the applications block 240 and then to the operational decisions block 260 (e.g., consider an application that operates using a structural model).

In the example of FIG. 2, the operational decisions block 260 may include a seismic survey design process 262, a well rate adjustment process 252, a well trajectory planning process 263, a well completion planning process 264 and a process for one or more prospects, for example, to decide whether to explore, develop, abandon, etc. a prospect.

Referring again to the data block 210, the well tops or drill hole data 212 may include spatial localization, and optionally surface dip, of an interface between two geological formations or of a subsurface discontinuity such as a geological fault; the seismic interpretation data 214 may include a set of points, lines or surface patches interpreted from seismic reflection data, and representing interfaces between media (e.g., geological formations in which seismic wave velocity differs) or subsurface discontinuities; the outcrop interpretation data 216 may include a set of lines or points, optionally associated with measured dip, representing boundaries between geological formations or geological faults, as interpreted on the earth surface; and the geological knowledge data 218 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g. fault A truncates fault B, fault B intersects fault C, etc.).

As to the one or more boundary representations 232, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 234, it may include a grid that partitions a volume of interest into different elementary volumes (cells), for example, that may be indexed according to a pre-defined, repeating pattern. As to the one or more unstructured meshes 236, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 251, it may include calculation of velocity of propagation of seismic waves (e.g., where seismic velocity depends on type of seismic wave and on direction of propagation of the wave). As to the seismic processing 252, it may include a set of processes allowing identification of localization of seismic reflectors in space, physical characteristics of the rocks in between these reflectors, etc.

As to the facies and petrophysical property interpolation 253, it may include an assessment of type of rocks and of their petrophysical properties (e.g., porosity, permeability), for example, optionally in areas not sampled by well logs or coring. As an example, such an interpolation may be constrained by interpretations from log and core data, and by prior geological knowledge.

As to the flow simulation 254, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 255, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example, a geomechanical simulation may be used for a variety of purposes such as, for example, prediction of fracturing, reconstruction of the paleo-geometries of the reservoir as they were prior to tectonic deformations, etc.

As to geochemical simulation 256, such a simulation may simulate evolution of hydrocarbon formation and composition through geological history (e.g., to assess the likelihood of oil accumulation in a particular subterranean formation while exploring new prospects).

As to the various aspects of the applications block 240, the well prognosis application 242 may include predicting type and characteristics of geological formations that may be encountered by a drill bit, and location where such rocks may be encountered (e.g., before a well is drilled); the reserve calculations application 244 may include assessing total amount of hydrocarbons or ore material present in a subsurface environment (e.g., and estimates of which proportion can be recovered, given a set of economic and technical constraints); and the well stability assessment application 246 may include estimating risk that a well, already drilled or to-be-drilled, will collapse or be damaged due underground stress.

As to the operational decision block 260, the seismic survey design process 261 may include deciding where to place seismic sources and receivers to optimize the coverage and quality of the collected seismic information while minimizing cost of acquisition; the well rate adjustment process 262 may include controlling injection and production well schedules and rates (e.g., to maximize recovery and production); the well trajectory planning process 263 may include designing a well trajectory to maximize potential recovery and production while minimizing drilling risks and costs; the well completion planning process 264 may include selecting proper well tubing, casing and completion (e.g., to meet expected production or injection targets in specified reservoir formations); and the prospect process 265 may include decision making, in an exploration context, to continue exploring, start producing or abandon prospects (e.g., based on an integrated assessment of technical and financial risks against expected benefits).

The system 200 can include and/or can be operatively coupled to a system such as the system 100 of FIG. 1. For example, the workspace framework 110 may provide for instantiation of, rendering of, interactions with, etc., the graphical user interface (GUI) 120 to perform one or more actions as to the system 200. In such an example, access may be provided to one or more frameworks (e.g., DRILLPLAN, PETREL, TECHLOG, PETROMOD, ECLIPSE, INTERSECT, KINETIX/VISAGE, PIPESIM, etc.). One or more frameworks may provide for geo data acquisition as in block 210, for structural modeling as in block 220, for volume modeling as in block 230, for running an application as in block 240, for numerical processing as in block 250, for operational decision making as in block 260, etc.

As an example, the system 200 may provide for monitoring data, which can include geo data per the geo data block 210. In various examples, geo data may be acquired during one or more operations. For example, consider acquiring geo data during drilling operations via downhole equipment and/or surface equipment. As an example, the operational decision block 260 can include capabilities for monitoring, analyzing, etc., such data for purposes of making one or more operational decisions, which may include controlling equipment, revising operations, revising a plan, etc. In such an example, data may be fed into the system 200 at one or more points where the quality of the data may be of particular interest. For example, data quality may be characterized by one or more metrics where data quality may provide indications as to trust, probabilities, etc., which may be germane to operational decision making and/or other decision making.

FIG. 3 shows examples of geologic environments 310 and 320 that include structures such as faults, fractures, etc., which may be represented by fault surfaces, fracture surfaces, etc. In the example environment 310, a fault may intersect one or more other faults and one or more wells may be present in the environment 310, which may interest a fault or faults. As shown, the environment 310 includes a fault network. In the example environment 320, fractures may be present and, for example, represented as a discrete fracture network (DFN). As an example, fractures can include natural and/or artificial fractures. As shown in FIG. 3, fractures may form a fracture network that is interconnected such that fluid may flow in the fracture network from one fracture to another fracture and, for example, to one or more wells.

As shown in the example environment 320 of FIG. 3, individual fractures can exist in a subsurface environment where a model may aim to model each of the fractures using a mesh. As explained, in various examples, a base mesh may be utilized where fractures are modeled using enrichment functions, which may be associated with various spatial locations as appropriate, for example, without altering nodes of the base mesh.

As explained with respect to FIG. 3, fractures may form a fracture network that is interconnected such that fluid may flow in the fracture network from one fracture to another fracture and, for example, to one or more wells. Such types of interconnections may be beneficial or may be detrimental. For example, it can be detrimental for a fracture generated by hydraulic fracturing using one well to extend to an extent that it intersects another well. In such an example, fluid drainage for the region fractured may be suboptimal. To address such detrimental types of interconnections, during hydraulic fracturing, one or more types of data may be acquired and utilized to determine if a fracture is propagating in a direction and to an extent that it may intersect another well and/or a fracture or fractures that are in fluid communication with another well or wells.

As explained, uncertainty can exist with respect to fractures. For example, in the environment 320 of FIG. 3, the individual fractures may be for one realization of many different possible realizations of the actual environment. As explained, re-meshing to represent fractures for different realizations can be time-consuming. As explained, enrichment functions may be utilized to represent one or more fractures in an environment where realizations can be generated optionally without altering a base mesh of the environment.

Figure 4:
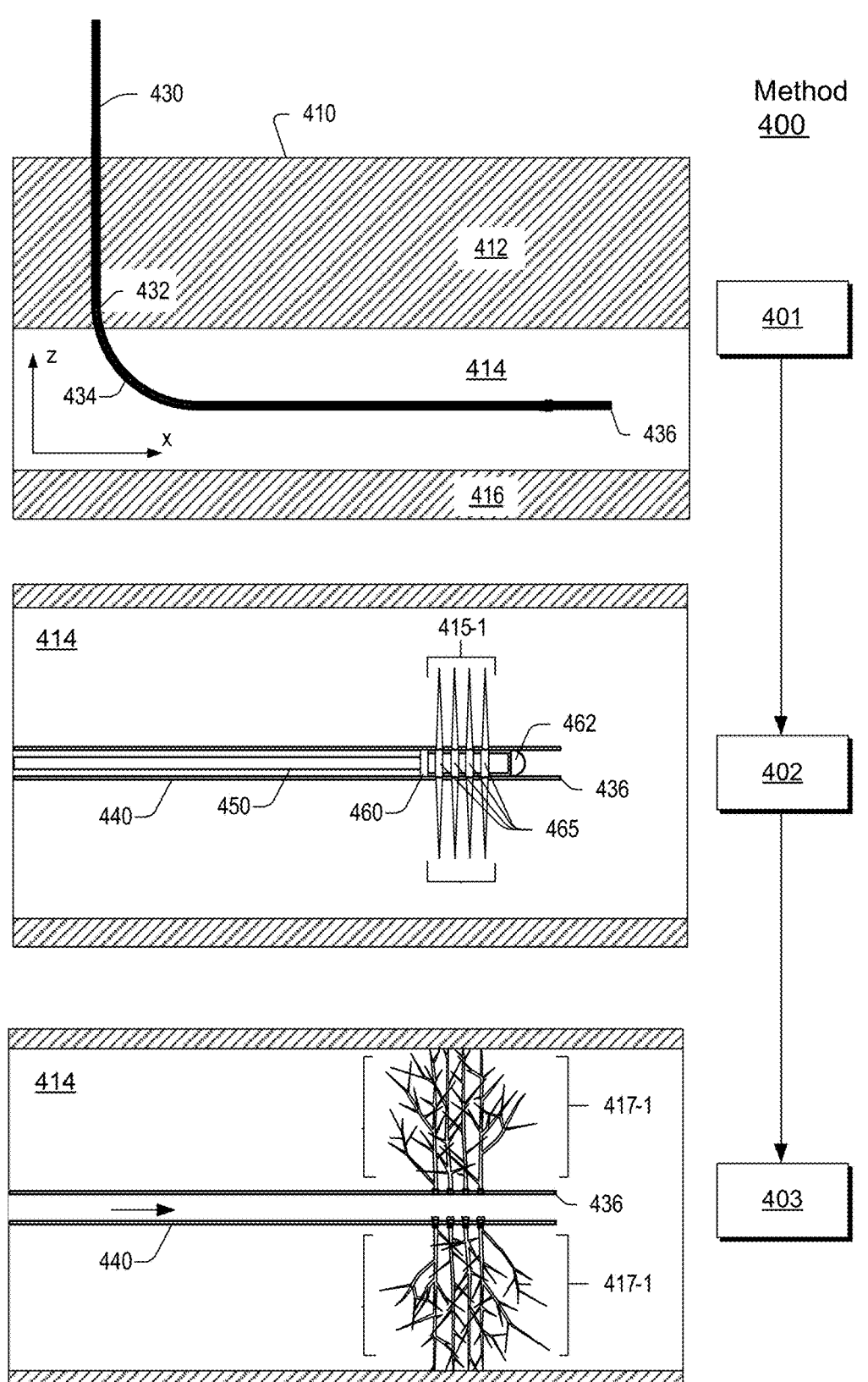
FIG. 4 illustrates an example of a method.
Figure 5:
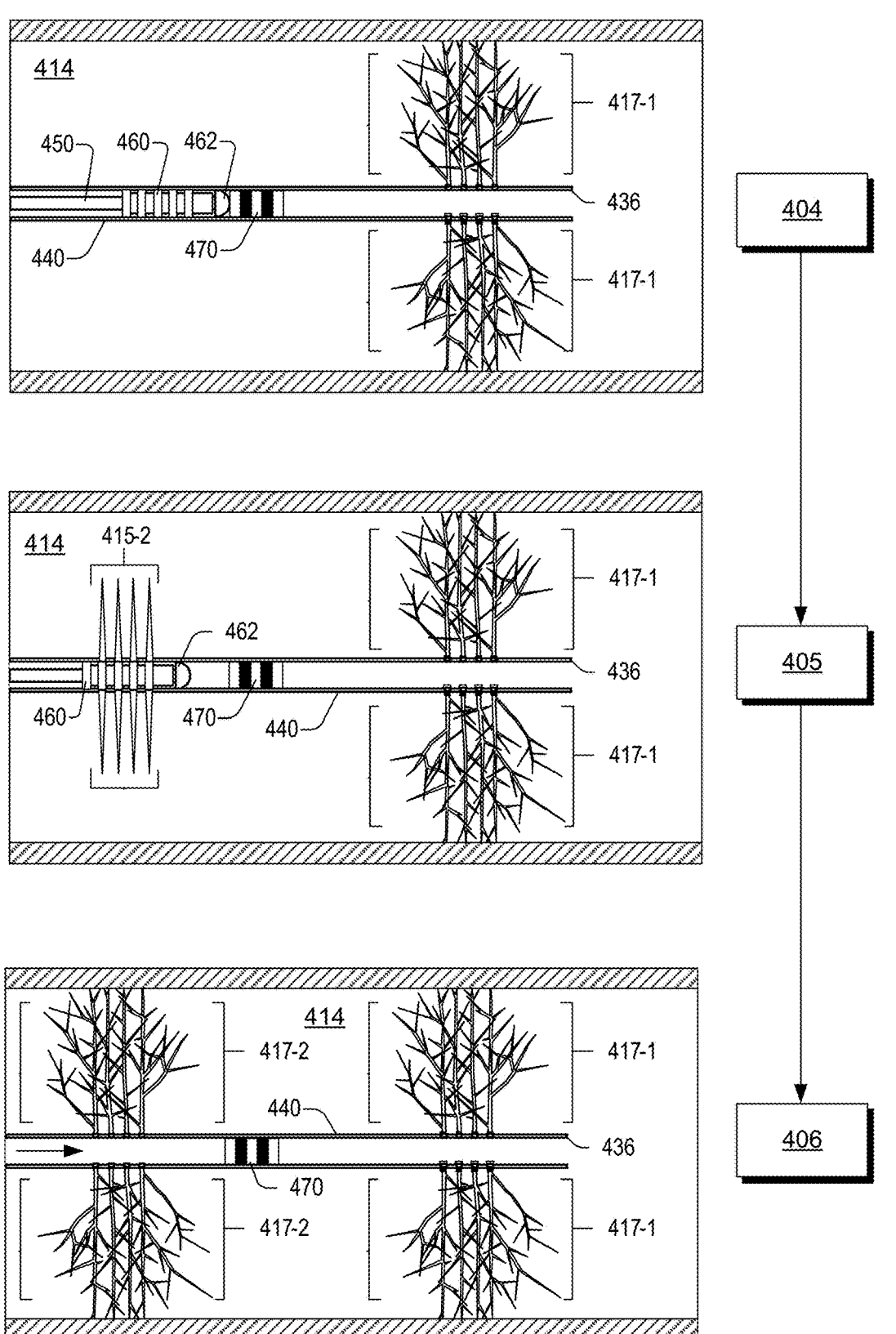
FIG. 5 illustrates an example of a method.

FIG. 4 and FIG. 5 show an example of a method 400 that includes generating fractures (e.g., hydraulic or artificial fractures). As shown, the method 400 can include various operational blocks such as one or more of the blocks 401, 402, 403, 404, 405 and 406. The block 401 may be a drilling block that includes drilling into a formation 410 that includes layers 412, 414 and 416 to form a bore 430 with a kickoff 432 to a portion defined by a heel 434 and a toe 436, for example, within the layer 414.

As illustrated with respect to the block 402, the bore 430 may be at least partially cased with casing 440 into which a string or line 450 may be introduced that carries a perforator 460. As shown, the perforator 460 can include a distal end 462 and charge positions 465 associated with activatable charges that can perforate the casing 440 and form channels 415-1 in the layer 414. Next, per the block 403, fluid may be introduced into the bore 430 between the heel 434 and the toe 436 where the fluid passes through the perforations in the casing 440 and into the channels 415-1. Where such fluid is under pressure, the pressure may be sufficient to fracture the layer 414, for example, to form fractures 417-1. In the block 403, the fractures 417-1 may be first stage fractures, for example, of a multistage fracturing operation.

Per the block 404, additional operations are performed for further fracturing of the layer 414. For example, a plug 470 may be introduced into the bore 430 between the heel 434 and the toe 436 and positioned, for example, in a region between first stage perforations of the casing 440 and the heel 434. Per the block 405, the perforator 460 may be activated to form additional perforations in the casing 440 (e.g., second stage perforations) as well as channels 415-2 in the layer 414 (e.g., second stage channels). Per the block 406, fluid may be introduced while the plug 470 is disposed in the bore 430, for example, to isolate a portion of the bore 430 such that fluid pressure may build to a level sufficient to form fractures 417-2 in the layer 414 (e.g., second stage fractures).

In a method such as the method 400 of FIG. 4 and FIG. 5, it may be desirable that a plug (e.g., the plug 470) includes properties suited to one or more operations. Properties of a plug may include mechanical properties (e.g., sufficient strength to withstand pressure associated with fracture generation, etc.) and may include one or more other types of properties (e.g., chemical, electrical, etc.). As an example, it may be desirable that a plug degrades, that a plug seat degrades, that at least a portion of a borehole tool degrades, etc. For example, a plug may be manufactured with properties such that the plug withstands, for a period of time, conditions associated with an operation and then degrades (e.g., when exposed to one or more conditions). In such an example, where the plug acts to block a passage for an operation, upon degradation, the passage may become unblocked, which may allow for one or more subsequent operations.

As an example, a component may be degradable upon contact with a fluid such as an aqueous ionic fluid (e.g., saline fluid, etc.). As an example, a component may be degradable upon contact with well fluid that includes water (e.g., consider well fluid that includes oil and water, etc.). As an example, a component may be degradable upon contact with a fracturing fluid (e.g., a hydraulic fracturing fluid). As an example, a degradation time may depend on a component dimension or dimensions and can differ for various temperatures where a component is in contact with a fluid that is at least in part aqueous (e.g., include water as a medium, a solvent, a phase, etc.).

As explained with respect to FIG. 3, a generated hydraulic fracture may intersect with and/or interact with one or more other fractures, whether natural or artificial. As mentioned, data may be acquired during a hydraulic fracturing operation that may be utilized to assess the hydraulic fracturing operation and/or one or more results thereof (e.g., one or more hydraulic fractures).

As to DAS and strain, an article by Ugueto et al., Can You Feel the Strain? DAS Strain Fronts for Fracture Geometry in the BC Montney, Groundbirch (SPE Annual Technical Conference and Exhibition, Calgary, Alberta, Canada, September 2019. doi: https://doi.org/10.2118/195943-MS), is incorporated by reference herein.

As an example, DAS may be utilized for one or more purposes. For example, consider low-frequency DAS (LF-DAS) and DAS microseismic. LF-DAS can be used to measure the occurrence of gradual strain perturbations due to the fracture propagation during hydraulic stimulation of a well. Perturbations of strain observed in one or more nearby monitoring wells, also known as DAS strain fronts (DAS-SF), can be used to map the azimuth of hydraulic fractures and, for example, to determine a variety of far-field dimensions and properties such as frac-to-frac distances, frac-zone-domain widths, propagation speed, as well as, information about well construction effectiveness.

DAS measurements when presented in the frequency domain as a Fourier spectrum are inherently broad band and range from close to DC to tenths of kHz. Depending on the application, specific DAS bandwidths can be used. Microseismic analysis for example, makes use of frequencies between 10 Hz and 500 Hz. In the case of DAS-SF, the measurements make use of low frequencies (e.g., less than 1 Hz) from the returning light that corresponds to the magnitude and phase of the axial strain rate induced in the fiber.

Figure 6:
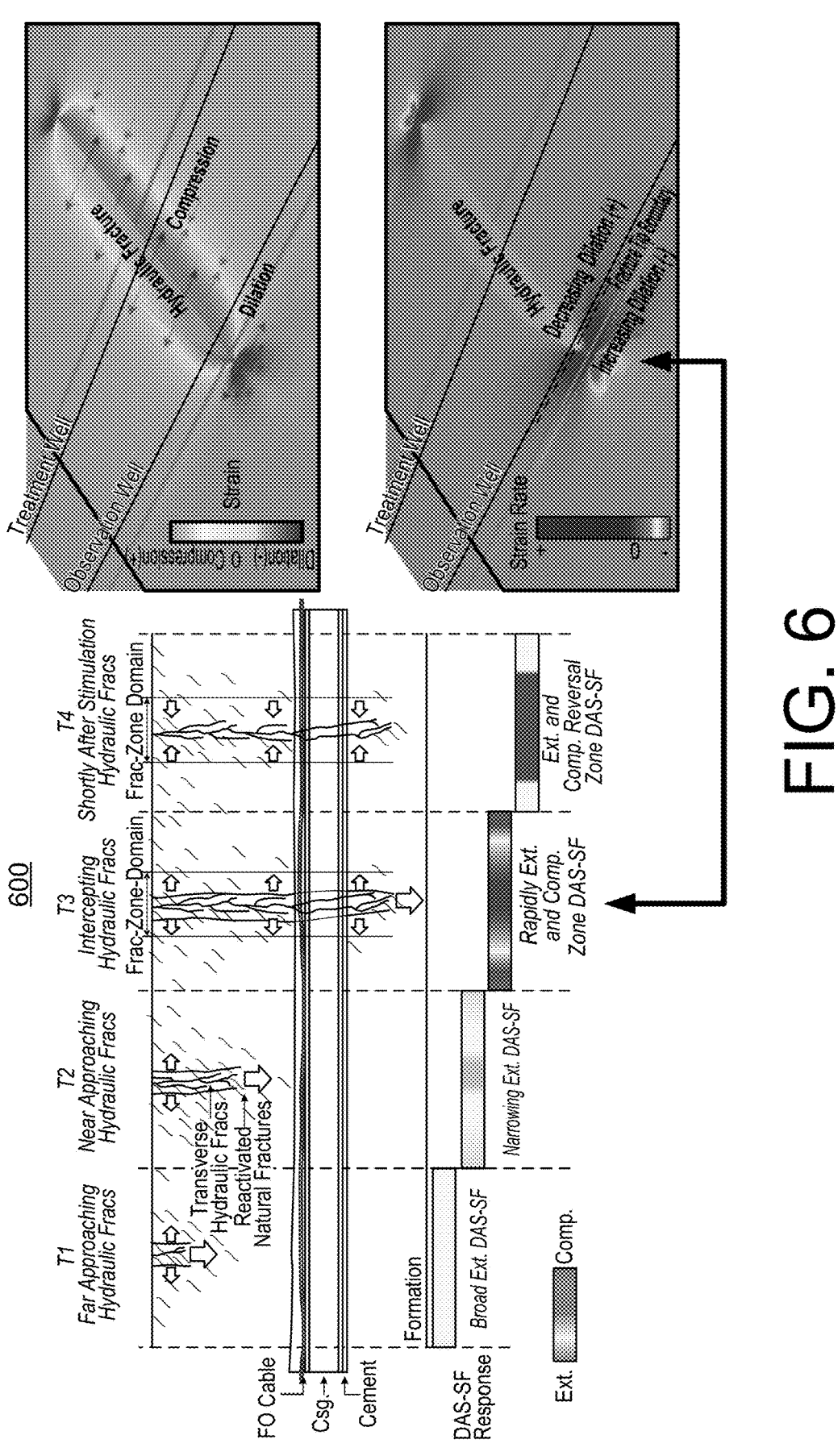
FIG. 6 illustrates an example of a system.

FIG. 6 shows an example of a system 600 that involves DAS where DAS can utilize fiber optic cables to sense strain distributions and changes in an environment. In such an example, optical fiber cable can operate as a sensing element where measurements are made by an optoelectronic device. DAS allows strain signals to be detected over relatively large distances and in harsh environments such as in downhole in wells of unconventional plays. As explained, a fiber optic (FO) cable (e.g., optical fiber cable) may be positioned in a cement layer surrounding a casing (e.g., csg.) of an observation well where the FO cable is sensitive to axial strain changes along the well.

In the system 600, graphics indicate how DAS can provide live (e.g., real-time) insights during a stimulation operation or operations in one or more nearby wells. For example, as a stimulation operation causes hydraulic fracturing, strain in the environment can occur that can generate a strain signature when getting close to, arriving in and crossing an observation well that includes one or more DAS fiber optic cables. As shown in the example of FIG. 6, a recorded strain signature can be driven by the distinct strain pattern at the tip of a propagating hydraulic fracture. Specifically, FIG. 6 shows simulation results for a hydraulic fracture that is generated by a stimulation operation performed using a treatment well (e.g., stimulation well) that is substantially parallel to and offset from an observation well. As shown in FIG. 6, the system 600 can respond using DAS by extending and compressing of the material that makes up the environment. As indicated, there can be broad extending, narrowing extending, rapidly extending and compressing, extending and compressing reversal, etc., which can occur at different times, such as, for example, the times labeled T1 (e.g., far approaching hydraulic fracture), T2 (e.g., near approaching hydraulic fracture), T3 (e.g., intercepting hydraulic fracture), and T4 (e.g., shortly after stimulation hydraulic fracture). In FIG. 6, the plots for the simulation results show strain with respect to compression and dilation and strain rate, ranging from negative values to positive values for the time T3.

Figure 7:
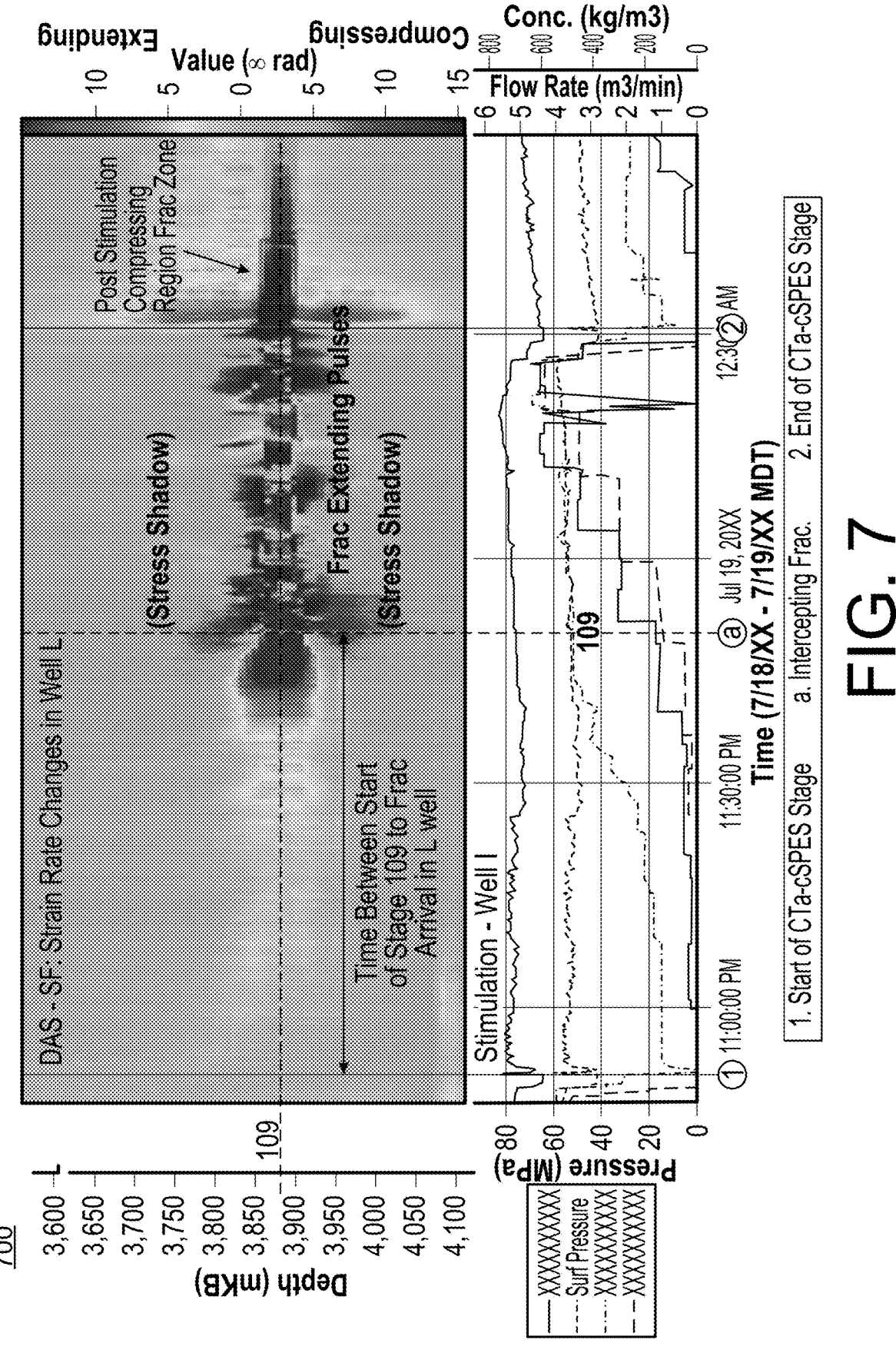
FIG. 7 illustrates examples of plots of data.

FIG. 7 shows an example of DAS signals 700 as acquired during a hydraulic fracturing operation. In the example of FIG. 7, the DAS signals 700 show time between start of stage 109 to fracture arriving in an observation well along with indications of stress shadows where depth is indicated along with a scale for compressing and extending. Additional information indicates pressure, flow rate and concentration of proppant with respect to time in the stimulation well.

As explained, an existing mesh may be re-meshed (e.g., updated) to include one or more additional fractures (e.g., fracture surfaces, etc.) to account for new information where re-meshing may incur various computational demands, for example, as a method for an updated mesh may include analyzing the updated mesh (e.g., "optimizing" the updated mesh) such that in one or more adjusted and/or new regions elements are not ill-shaped.

Fracture geometries, as subterranean features, can be susceptible to various types of uncertainties. For example, seismological interpretation of fractures can include uncertainties as to extent, position, etc. of a fracture. Where fractures include hydraulic fractures, such fractures may be generated in stages where, for example, a mesh is to be updated after each stage. For various reasons, updating a mesh to conform the mesh to one or more features in a domain can be computationally intensive. A workflow that includes updating a mesh can degrade user experience and restrict scenario-based approaches, which may have consequences as to predictions that may be made based at least in part on a model (e.g., a structural model of a geologic environment).

As explained, a method can include implementing the extended finite element method (XFEM). The XFEM is a numerical technique that extends the finite element method (FEM) approach by enriching a solution space for solutions to differential equations with discontinuous functions.

Figure 8:
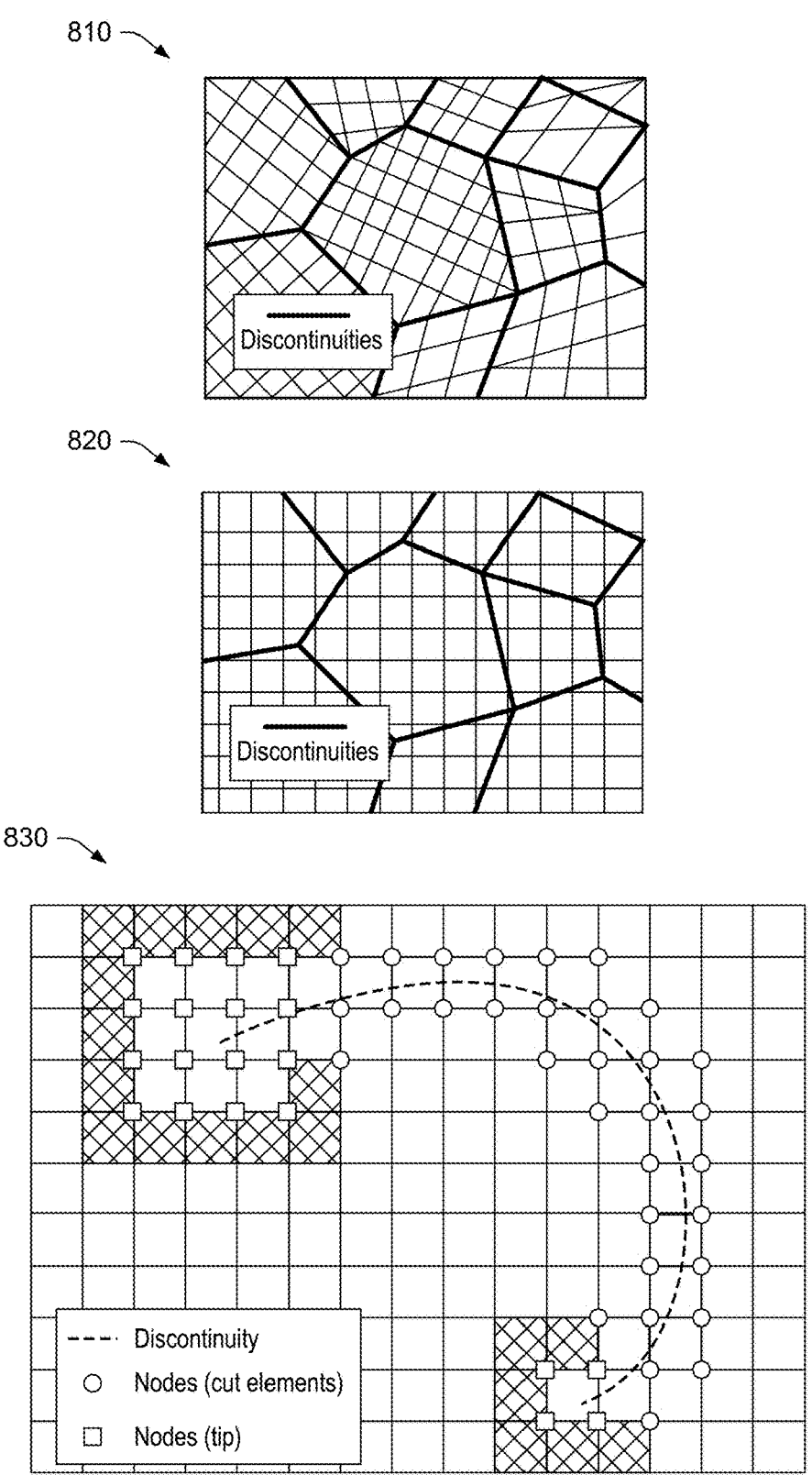
FIG. 8 illustrates examples of meshes and discontinuities.

FIG. 8 shows an example of a mesh 810 that includes discontinuities, an example of a mesh 820 that includes discontinuities and an example of a mesh 830 that includes a discontinuity (e.g., a discontinuous feature or discontinuity feature). In the mesh 810, elements conform to the discontinuities while, in the mesh 820, discontinuities can intersect elements. As shown in the example mesh 810, the elements may be unstructured while, in the example mesh 820, the elements may be structured. As to the mesh 830, various nodes are identified including nodes of elements that are intersected by the discontinuity and nodes of elements that are adjacent to a tip (e.g., an end of the discontinuity) or within a neighborhood of a tip (e.g., an end of the discontinuity).

In FIG. 8, the mesh 810 may be a finite element method (FEM) mesh while the mesh 820 may be an extended finite element method (XFEM) mesh.

The finite element method (FEM) can include generating a mesh of elements, defining basis functions (e.g., shape functions) on "reference" elements and mapping of reference elements onto elements of the mesh. The XFEM can include applying a partition of unity to a topological space X, for example, to form a set R of continuous functions from X to a unit interval (e.g., [0,1]) such that for each point, $x \in X$, there is a neighborhood of x where a finite number of the functions of R are non-zero (e.g., where other functions of R are zero) and where the sum of function values at x is unity (e.g., $\Sigma_{\rho \in R}\rho(x)=1$). Partition of unity can allow for the presence of a discontinuity (e.g., or discontinuities) in an element by enriching degrees of freedom with particular displacement functions.

The XFEM can include so-called "jump" functions where such functions may account for discontinuities. As an example, a discontinuity may be classified as a type of discontinuity. For example, consider discontinuity classified as a weak discontinuity or as a strong discontinuity. A weak discontinuity may be a type of discontinuity associated with a jump in a gradient of a solution. In such an example, an enrichment function may be chosen such as the abs-function. For a strong discontinuity, a jump may be present in a solution. In such an example, an enrichment function may be choses such as the sign-function or the Heaviside function. The Heaviside function (e.g., a unit step function), which may be denoted by H, is a discontinuous function. For example, for negative arguments, the value of the Heaviside function can be set to zero and, for positive arguments, the value of the Heaviside function can be set to unity (e.g., or vice-versa, etc.).

As an example, a method can include implementing discontinuous basis functions and polynomial basis functions for nodes that belong to elements that are intersected by a discontinuity, for example, optionally to provide a basis that can account for discontinuity opening displacements. As an example, implementation of the XFEM can improve convergence rates and accuracy. As an example, implementation of the XFEM for modeling one or more discontinuities may alleviate including representations of such one or more discontinuities by a mesh (e.g., conforming triangles, tetrahedra, etc.).

As an example, consider implementation of the XFEM to alleviate discretization of discontinuity feature interfaces in a mesh, for example, to allow for propagation modeling of a discontinuity feature.

FIG. 9 shows an example of a mesh 802 of a domain that includes a discontinuity feature 810 that includes a portion 812, a feature transition portion 814 and a feature tip 816. The mesh 802 includes various nodes or vertices. In the example of FIG. 9, equations may be formulated that can account for various types of nodes. For example, the nodes of the mesh 802 may be classified as being on a particular class or classes: model nodes, nodes whose shape function support is cut by the feature interior (e.g., of the feature 810), and nodes whose shape function support is cut by a feature tip (e.g., the feature tip 816).

FIG. 9 shows various equations, which are reproduced below as Equations (1) to (4):

$$u(x) = \sum_i u_i \phi_i(x) \tag{1}$$

$$u(x) = \sum_i u_i \phi_i(x) + \sum_j b_j \phi_j(x) H(x) \tag{2}$$

$$u(x) = \sum_i u_i \phi_i(x) + \sum_j b_j \phi_j(x) H(x) + \sum_k \phi_k(x) \left( \sum_{\ell=1}^{4} c_k^\ell F_\ell(r(x), \theta(x)) \right) \tag{3}$$

$$\{F_\ell(r, \theta)\} := \tag{4}$$

$$\left\{ \sqrt{r} \sin\left(\frac{\theta}{2}\right), \ \sqrt{r} \cos\left(\frac{\theta}{2}\right), \ \sqrt{r} \sin\left(\frac{\theta}{2}\right) \sin(\theta), \ \sqrt{r} \cos\left(\frac{\theta}{2}\right) \sin(\theta) \right\}$$

Equation (1) can apply for the mesh 902; Equation (2) can apply for the mesh 902 with the discontinuity feature 910 (e.g., a discontinuous feature in the domain represented by the mesh 902); and Equation (3) can apply for the mesh 902 with the discontinuity feature 910 where it includes the feature tip 916 within the mesh 902 where, for example, Equation (4) may be used as a near tip enrichment function (e.g., within a radius, r). As shown, Equations (2) and (3) include a jump function such as, for example, the Heaviside function.

As an example, a method can include enrichment of an interpolation function. For example, consider Equations (1), (2) and (3) where the first sum can represent classical shape functions, the second sum can account for one or more completely faulted elements by adding a Heaviside multiplier to the shape function and the third sum can represent enrichment at a tip-loop (e.g., with singular functions such as in, for example, Equation (4)).

As an example, a feature in a geologic environment may be a treated as a stationary feature. As an example, a feature in a geologic environment may be treated as a dynamic feature. As an example, for a particular solution (e.g., at a particular time or a particular span of time), a feature may be treated as a stationary feature. In such an example, one or more parameters may be updated based on the solution, for example, to update the feature (e.g., for a solution at another time, etc.).

As explained with respect to FIG. 4 and FIG. 5, production can be enhanced through hydraulic fracturing. In particular, production from unconventional hydrocarbon reservoirs is widely enabled through parallel horizontal wells that are hydraulically stimulated for fractures to be generated that provide drainage pathways. The hydraulic fractures generated during stimulation are opening and propagating relative to the prevailing in-situ stress field and are influenced in their growth by the natural fractures of the rock fabric. The final size (e.g., characterized by length, height and opening) of a generated hydraulic fracture is controlled by the in-situ conditions as well as on factors such as fluid pumping rate and duration of the stimulation. Optimal horizontal well placement is achieved when the generated fractures access the entire volume between wells without gaps or overlaps between neighboring wells. In particular the scenario in which a hydraulic fracture is propagating across a neighboring well is highly undesirable as it can impact detrimentally the integrity and production of that well.

As explained, DAS can be utilized to detect strain signals over relatively large distances (e.g., germane to a drainage area for a gang of wells that may be drilled from one or more pads) and in harsh environments such as downhole in wells of unconventional plays. As an example, DAS may be utilized in one or more other types of fracturing operations. For example, consider fracturing in a geothermal recovery operation where water injected into an injection well is exposed to subsurface temperatures that can heat the water to generate fractures where the water may be produced as steam via one or more production wells; noting that such one or more production wells may be utilized as one or more observation wells (e.g., using DAS, etc.).

Hydraulic fractures propagating through a rock mass produce a distinct displacement field and stress pattern. Opening of a fracture displaces rock normal to the fracture surface and thus induces compression of the rock along the sides of the fracture resulting in an increase in stress. In contrast, in front of the tip of a propagating hydraulic fracture, the stress is relieved with an increase in dilation. As mentioned, FIG. 6 shows simulation results for a treatment well and an observation well where strain and strain rate may be observed (e.g., measured using DAS). The results in FIG. 6 show a characteristic signature around the fracture of the treatment well as the fracture is generated during a hydraulic fracturing operation.

As explained, a signature of an approaching hydraulic fracture can be recorded over time by DAS equipment in one or more observation wells. The expected strain signature to be recorded by DAS can also be modelled with different approaches. Numerical simulations can be used to compute the characteristic strain pattern around a hydraulic fracture and extract a time-lapse pattern along an observation well.

Figure 10:
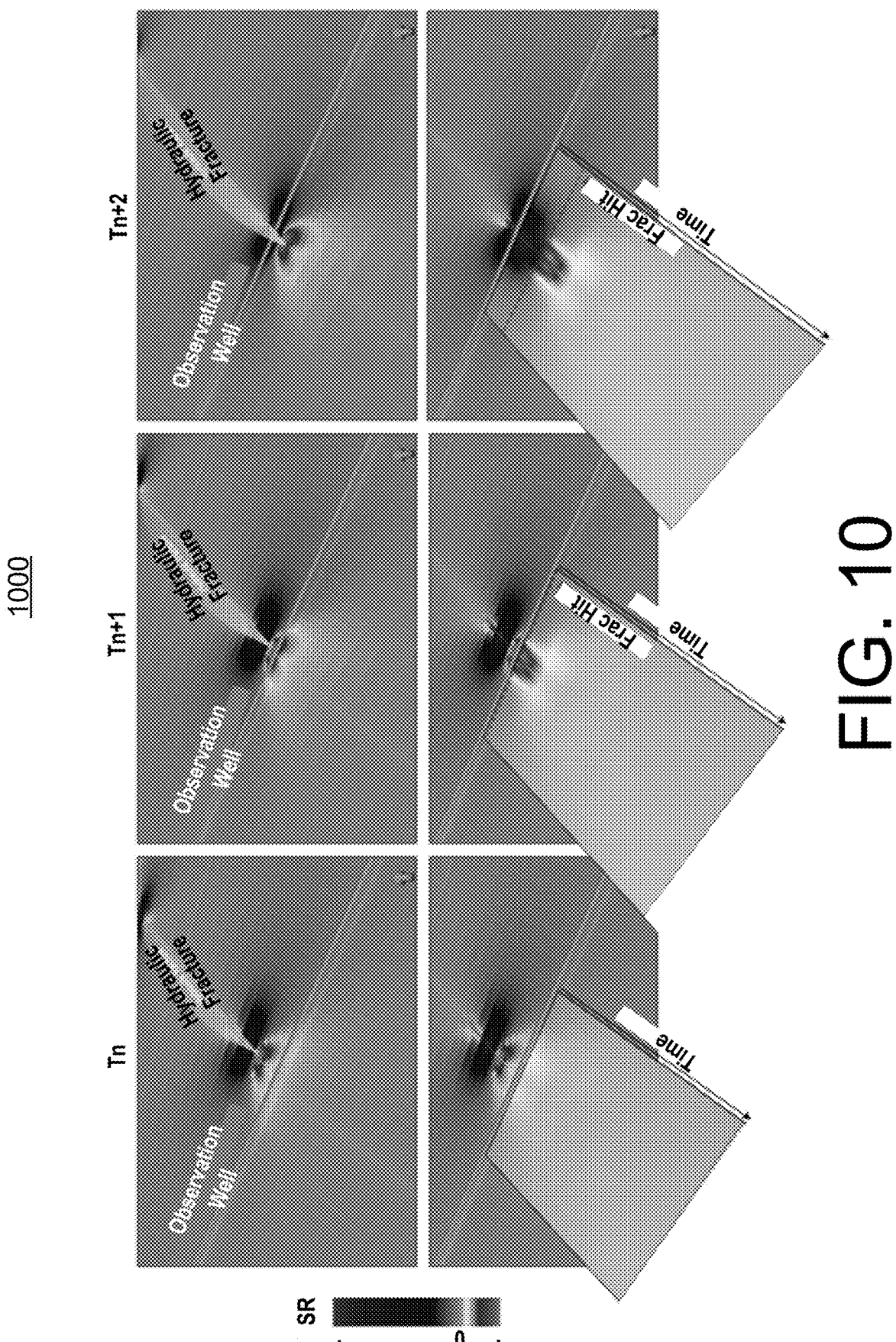
FIG. 10 illustrates examples of simulation results.

FIG. 10 shows a series of graphics from simulation results 1000 with respect to time. As shown, a framework can generate a simulated DAS signal at a horizontal well responsive to propagation of an approaching hydraulic fracture.

As an example, a framework can combine the relatively high sensitivity of low-frequency DAS for detecting strain changes in its environment with advanced numerical modeling techniques to characterize a natural fracture system in a subsurface geologic region in which DAS sampling occurs while a hydraulic fracture is propagating. During propagation (e.g., growth), a hydraulic fracture disturbs its vicinity and reveals prevailing natural fractures as their combined effect impacts the strain pattern that can be captured by DAS measurements.

FIG. 11 shows, within the graphics 1100, natural fractures close to propagating hydraulic fractures that will impact DAS signals recorded at an observation well. As explained with respect to FIG. 3, fractures may be modeled as discrete fractures in a discrete fracture network (DFN) where such fractures can include one or more natural fractures and/or one or more hydraulic fractures. Natural fractures can include various types of natural fractures, which may be filled, unfilled, activated, re-activated, etc.

A natural fracture can be a crack or surface of breakage within rock not related to foliation or cleavage in metamorphic rock along which there has been no movement. A natural fracture along which there has been displacement is a fault. When walls of a fracture have moved only normal to each other, the fracture is called a joint. Fractures can enhance permeability of rocks greatly by connecting pores together, and for that reason, artificial fractures can be induced mechanically in some reservoirs in order to boost hydrocarbon flow. In some shale reservoirs, natural fractures improve production by enhancing effective permeability. In other cases, natural fractures can complicate reservoir stimulation.

Unlike induced fractures, natural fractures are caused by stress in the formation usually from tectonic forces such as folds and faults (e.g., a type of natural fracture). Natural fractures tend to be more common in carbonate rocks. Fractures tend to occur in preferential directions, determined by the direction of regional stress, which may be parallel to the direction of nearby faults or folds, but in the case of faults, they may be perpendicular to the fault or there may be two orthogonal directions.

As to open and healed fractures, a fracture can be a high permeability path in a low permeability rock, or a fracture may be filled with a cementing material, such as calcite, leaving the fracture with very little to no permeability. In various instances, the total volume of fractures is small compared to the total pore volume of a reservoir.

As to size, naturally fractured reservoirs are observed across a vast range of scale from microcracks to long features in excess of a kilometer. The vertical extent of fractures may be controlled by thin layers of plastic material, such as shale beds or laminations, or by weak layers of rock, such as stylolites in carbonate sequences. The width of such beds may be too small to be seen on logs, so fractures may seem to start and stop.

Naturally fractured reservoirs can be open, permeable pathways, or they can be permeability baffles resulting from the presences if secondary mineralization or other fine-grained material filling the gaps. Most natural fractures are more or less vertical. Horizontal fracture may exist for a short distance, propped open by bridging of the irregular surfaces. Most horizontal fractures, however, are sealed by overburden pressure. Both horizontal and semi-vertical fractures can be detected by various logging tools.

Naturally fractured reservoirs have been classified according to the relative contribution of the matrix and fractures to the total fluid production. For example, consider Type 1, Type 2, and Type 3 fractured reservoirs where Type 1 fractures provide essential porosity and permeability, Type 2 fractures provide essential permeability, and Type 3 fractures provide a permeability assistance.

As explained, a DFN approach may be utilized for modeling fractures where the number of fractures can be in excess of 10, 100, 1000, or more. With a large number of natural fractures to be considered, however, an explicit meshing approach for numerical modeling also becomes unfeasible.

As explained, an XFEM approach can be utilized as an alternative to explicit mesh representation of various fractures. Such an approach allows for capturing the influence of natural fractures onto a simulated DAS signature that resembles a potential DAS recording (e.g., or other strain recording) and enables an inversion approach to characterize the natural fractures.

Figure 12:
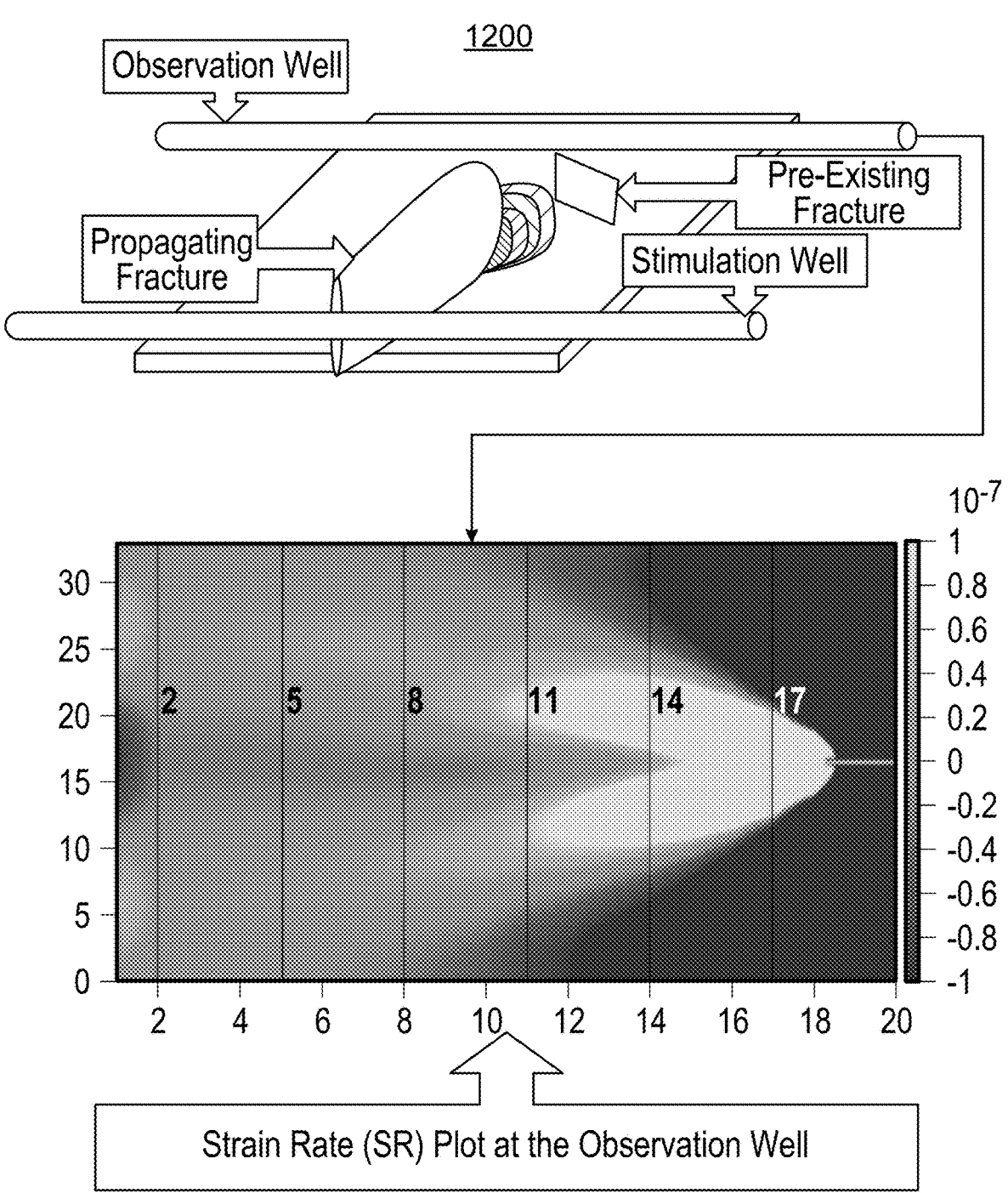
FIG. 12 illustrates an example of system.

FIG. 12 shows an example of a method 1200 where strain information (e.g., strain, strain rate, etc.) can be generated using a framework that includes a model of a subsurface geologic region with a treatment well as a stimulated well and an observation well as a measurement well where a pre-existing fracture can be included and interact with physical phenomena associated with a propagating hydraulic fracture emanating from the treatment well. For example, such a framework can utilize a mesh and enrichment functions to represent one or more fractures. In the example of FIG. 12, the propagating fracture is shown as being a wing propagating in a direction away from the treatment well;

noting that another wing may be propagating in an opposite direction away from the treatment well, where, for example, one or more additional observation wells may be present for purposes of measuring strain information. In a model-based approach, an observation well can be a construct such as, for example, a point, a line, a series of points, etc., in a model where strain information is desired to be known. In various examples, an observation well can correspond to an actual well that can be, that is used for and/or has been used for acquiring strain information (e.g., via DAS, etc.).

As explained, when it comes to modeling hydraulic fractures, the FEM presents challenges, including generation of a mesh that has to conform to an ever changing fracture configuration and that the mesh may demand sufficient resolution (e.g., fine spacing) near a fracture tip to capture singular fields. As explained, use of enrichment functions can reduce demand for re-meshing and/or mesh refinement. As explained, enrichment functions "enrich" an approximation space. Enrichment functions can incorporate a priori knowledge about solution behavior in a finite element approximation space. As an example, for a given mesh, a method can include enriching nodes, whose support is cut by a crack path, with a discontinuous enrichment function and enriching tip nodes with a singular enrichment function.

The XFEM approach can be utilized such that a mesh may be a non-conforming mesh that does not demand mesh refinement where discontinuous enrichment occurs for nodes cut by a discontinuity and where singular tip enrichment occurs for tip element(s). The XFEM approach can introduce additional degrees of freedom on enriched nodes.

Figure 13:
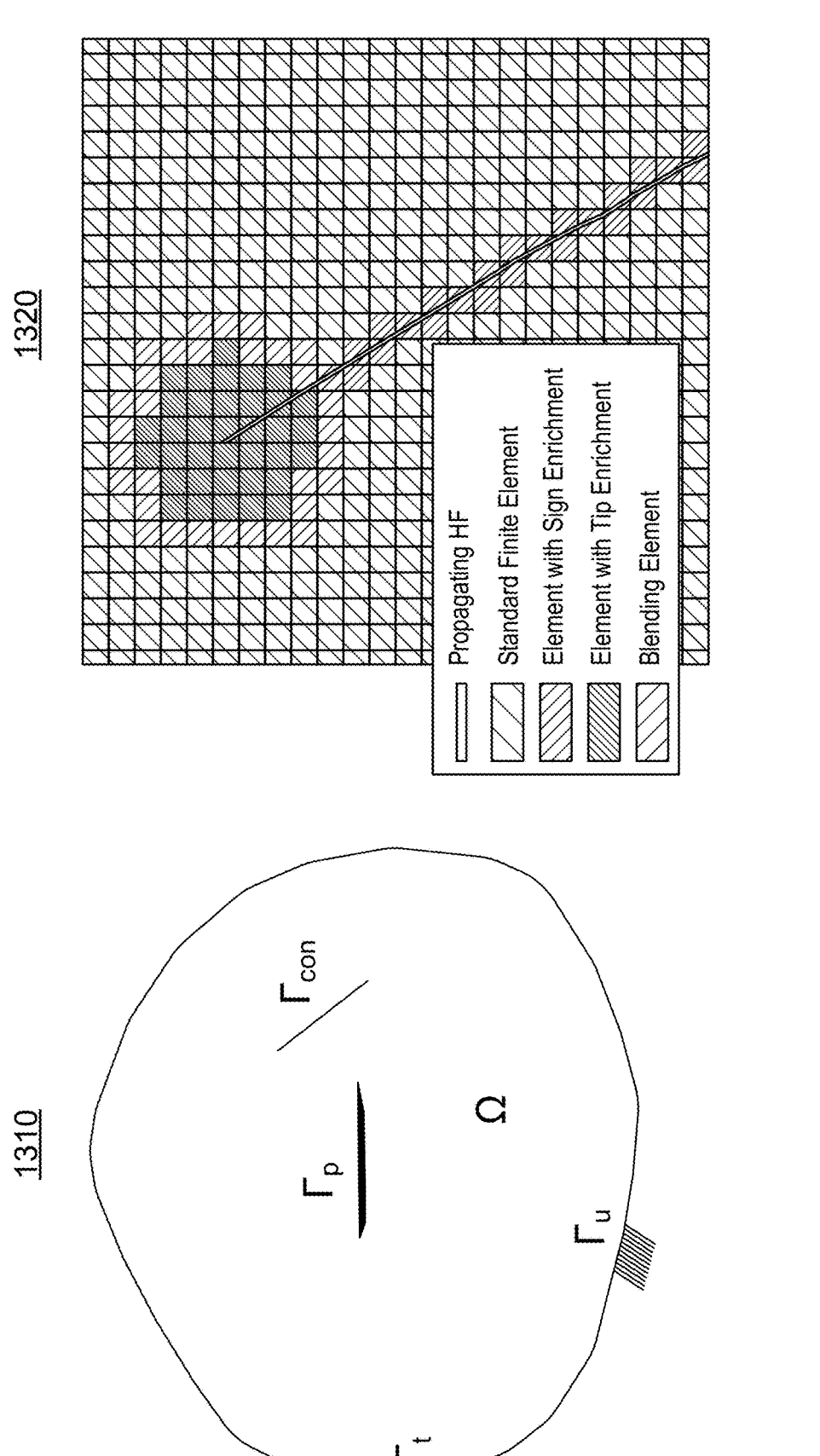
FIG. 13 illustrates an example of a multidimensional closed surface and an example of a representation of a discontinuity.

FIG. 13 shows examples of a multidimensional space 1310 and a grid 1320, which may be utilized by a framework to implement an XFEM approach. As to an XFEM approach, consider a discretized weak form of the governing equations that can account for compliance, contact, boundary tractions and fracture pressure. In such an example, an XFEM approach may provide a discretized approximation for the finite element method (FEM) and additional terms for discontinuous enrichment and crack tip enrichment. As an example, as to a contact condition, a penalty technique may be implemented using a penalty parameters and fracture normal opening displacement.

As an example, a framework may characterize a subsurface scenario as follows: find $u^h \in U$ such that $\forall v^h \in U^h$. In such an example, compliance, contact, boundary tractions and fracture pressure may be represented, respectively as follows:

$$\int_{\Omega} C\epsilon(u^h):\epsilon(v^h)d\Omega + \int_{\Gamma_{con}} \tilde{F} \cdot v^h d\Gamma = \int_{\Gamma_t} F \cdot v^h d\Gamma + \int_{\Gamma_p} P \cdot v^h d\Gamma$$

As to an example of an XFEM approximation, consider the following terms for an FEM approximation along with discontinuous enrichment and crack tip enrichment, respectively:

$$u^h(x) = \sum_{i \in I} N_i(x)u_i + \sum_{i \in I^*} N_i^*(x) \cdot [S(x) - S(x_i)]a_i +$$

$$\sum_{k=1}^{m} \sum_{i \in J_k^*} N_i^*(x) \cdot [B^k(r, \theta) - B^k(r, \theta_i)]b_i^k$$

As an example, a contact condition may be represented as follows according to a penalty technique:

$$\tilde{F} = \varepsilon_N w_N$$

$$\text{where: } w_N(x) = [u_+(x) - u_-(x)] \cdot n(x), x \in \Gamma_{con}$$

In the foregoing example, the penalty parameter may be defined as $\varepsilon_N = E/100$.

As to a formulation of a framework, consider a pressurized crack propagating in a domain (e.g., subsurface region) where a pre-existing fracture is also present. In such an example, the two faces of the preexisting fracture can be assumed to be in contact with each other. As explained, the discretized weak form of the governing equations can include contributions from compliance, contact, boundary tractions, and fluid pressure inside the propagating fracture (e.g., fracture pressure). As explained, a displacement field can be approximated by the XFEM approximation, which can include an FEM approximation and one or more enriched parts of the approximation. In such an example, the discontinuous enrichment can be active at the nodes of the elements cut by the crack; whereas, the singular tip enrichment can be present at the nodes of a tip element. Additional degrees of freedom associated with each instance of enrichment can be present at corresponding nodes. The contact condition can be implemented using a penalty technique where, for example, a penalty parameter can be associated with the Young's modulus (E). As an example, a contact condition can be applied in the normal direction where there may be no restriction on slippage of cracks.

Figure 14:
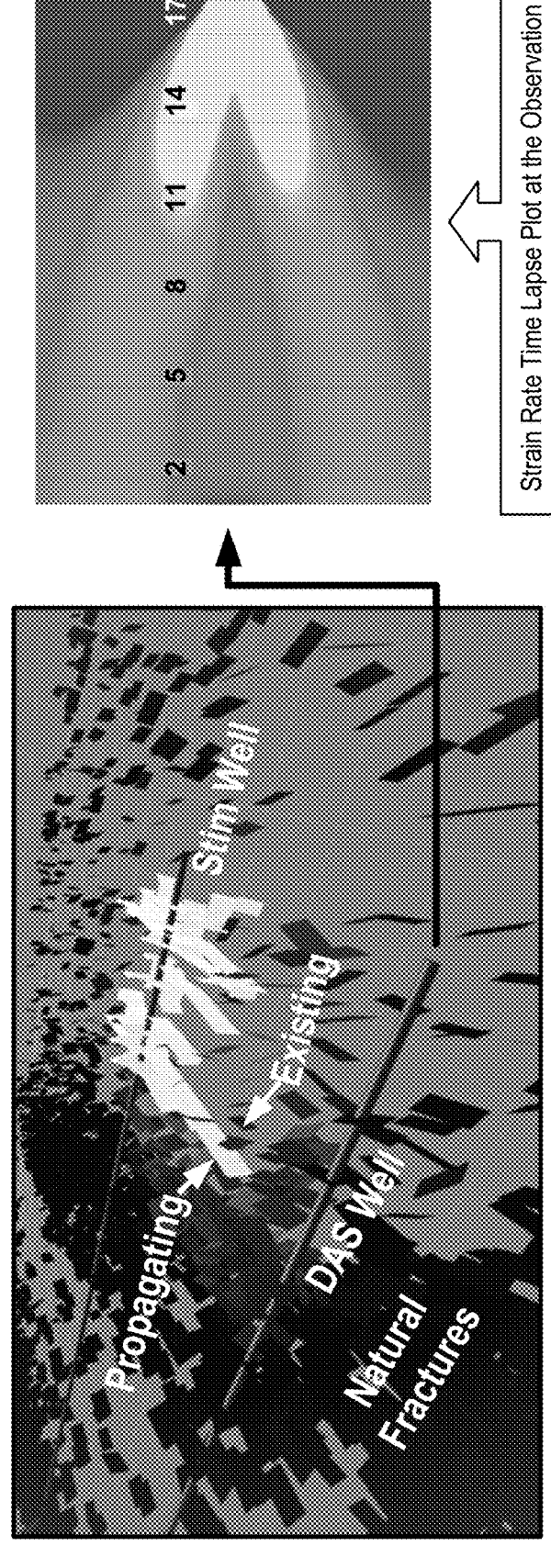
FIG. 14 illustrates an example of a system.

FIG. 14 shows an example of a method 1400 that is illustrated through various graphics, including model graphics and simulation results graphics. The method 1400 may be implemented via one or more frameworks (see, e.g., the frameworks in FIG. 1). In the method 1400, two horizontal wells can be modeled, for example, as features in a subsurface geologic region that can be represented using the FEM. As shown, one of the wells is being stimulated and the other is an observation well for purposes of DAS fiber low frequency strain measurements along its lateral direction. As the propagating hydraulic fracture propagates through the discrete fracture network (DFN), the strain produced by it creates changes in the nearby rock which causes the pre-existing fractures to shear and thus "illuminate" them in the strain field. These changes produce particular signatures in the strain measurements in the observation well. These changes can be represented using a time lapse plot of the lateral strain rate in the observation well.

As an example, a framework can enable an inversion workflow in which a recorded signal is used to characterize natural fractures and the so-called stimulated reservoir volume (SRV), where, for example, both can be used to optimize well placement and spacing in unconventional reservoirs to increase the return on investment (e.g., effective drainage, etc.).

As an example, a framework or frameworks can provide two modeling parts, a forward model and an inversion model. The first modeling part can be a forward modeling that models the effect of one or more natural fracture networks (e.g., one or more DFNs, etc.) on a synthetic low-frequency DAS signature in a potential observation well. The second modeling part can be an inverse model that interprets an observation in an actual recorded DAS signature and inverts the observation for a responsible natural fracture pattern present in the subsurface.

Forward modeling to compute a DAS signature to be recorded in an observation well can utilize a framework that can implement a XFEM approach (e.g., used of enrichment functions). As explained, XFEM is a numerical simulation method that uses the FEM as a basis and that adds additional features to the FEM. The FEM discretizes a modeling domain into elements and then it approximates the solution across elements using a numerical solver. As explained, accuracy of a solution can depend on quality of a numerical approximation and mesh resolution where higher order approximation and/or mesh refinement can capture a more accurate solution. However, the FEM, by itself, demands that there can be no discontinuities within each element such that a mesh has to resolve those explicitly. For example, explicit representation using a mesh demands conforming the mesh around natural and propagating fractures to capture their impact on the surrounding stress field. When a fracture grows and propagates, it may change size, shape and orientation. Such changes demand adapting the mesh which is time-consuming and becomes even more cumbersome with increasing number of fractures. The FEM also demands high grid resolution to capture high gradient solutions. As a stress field at a tip of a propagating fracture is singular and as, near the tip, it has a very high gradient, the FEM, by itself, demands a fine mesh around a propagating tip of a fracture.

In the XFEM approach, some known characteristics of a solution can be incorporated in a numerical approximation by using special approximation functions (e.g., enrichment functions). Such an approach allows for simulation of complex phenomena, like fracture propagation, without having to perform mesh alteration. As explained, a near-tip higher order stress can be captured using appropriate tip enrichment functions. This proves valuable when dealing with a considerable number of fractures like a fracture network in a subsurface environment.

As explained, a forward model can be based on an XFEM approach to simulate propagation of a hydraulic fracture through a domain with pre-existing natural fractures. The preexisting fractures can slip under the influence of the stress changes taking place due to propagation of a hydraulic fracture in their vicinity. These slipping fractures along with the propagating fracture create a stress change in nearby rock. The longitudinal strain-rate can be computed along a respective direction of an observation well. This strain rate can be affected by the changes taking place in the rock due to the propagating as well as slipping fractures.

With a computational approach that applies the XFEM, a framework can invert actual recordings for natural fracture characteristics. For example, consider a method that includes: computing the strain rate signature at an observation well as impacted by different preexisting natural fracture configurations; creating templates for the strain rate signature as impacted by different natural fracture orientations; creating templates for the strain rate signature as impacted by different distances of natural fractures; combining both templates to describe various combinations of strain rate signatures for arbitrary distance and orientation of the pre-existing natural fractures from an observation well; recording a DAS signature in an actual observation well with an approaching hydraulic fracture; matching the signature recorded against the available templates and compute more scenarios if desired; and inferring orientation, distance and density of the natural fractures from the match with the XFEM results.

FIG. 15 shows a series of graphics 1500 that may be presented as a graphical user interface (GUI). The graphics 1500 show a top view on strain pattern around a hydraulic fracture propagating through natural fractures (left) and time-lapse strain recording on two observation wells (right).

As shown, the natural fractures are at 45 degrees with respect to the hydraulic fracture. Time increments are indicated in the graphics 1500, including times of 2, 5, 8, 11, 14 and 17.

In the example of FIG. 15, as mentioned, the model includes multiple natural fractures aligned at an angle of 45 degrees. Through use of a hydraulic fracturing framework that includes a mesh and enrichment functions to represent one or more hydraulic fractures, the change in the strain rate signature in an observation well due the angle of the natural fractures can be simulated. In the example of FIG. 15, multiple shadows exist for the fracture that approach and cut the observation well at an angle. Such information can be utilized to characterize a subsurface geologic region.

As shown in the example of FIG. 15, a natural fracture may reflect energy generated by a hydraulic fracture as the hydraulic fracture propagates, thereby distorting strain and strain rate. As explained, sensed information may be utilized together with modeling to determine one or more characteristics of one or more natural fractures. For example, sensed information may be matched to one or more simulated results for different scenarios (e.g., different realizations). In such an example, a matching simulated result for a model-based scenario may be representative of an actual subsurface geologic region. As an example, where matching occurs for multiple scenarios, the actual subsurface geologic region may be a mixture of the multiple scenarios. For example, consider a scenario with natural fractures at an angle of 40 degrees and another scenario with natural fractures at an angle of 50 degrees. In such an example, an actual subsurface geologic region may include natural fractures at an angle of 45 degrees. As an example, where a percentage match and/or a probabilistic match occur, one or more percentages and/or one or more probabilities may be utilized to mix scenarios to better represent an actual subsurface geologic region. For example, consider a 20 percent match to 40 degrees and an 80 percent match to 50 degrees such that an estimate of 48 degrees may be utilized to represent an actual subsurface geologic region (e.g., considering that a scenario greater than 50 degrees results in a less than 80 percent match).

As an example, a framework may provide for characterizing fractures and fracturing in an unconventional formation (e.g., unconventional reservoir). As explained, a framework may provide for characterizing size and orientation of fractures using DAS data where such fractures may form one or more fracture networks that may include one or more of natural, reactivated and new fractures.

As shown in FIG. 15, a framework may effectively provide headlights that can illuminate features that may be encountered during subsurface fracturing where such features may include cavities, geobodies, other fractures, etc. As an example, a framework can utilize DAS data to generate a DAS-based roadmap in real-time to control one or more fracturing operations. As explained, a framework may provide for characterization of existing features such that field operations can be controlled in view of such existing features. In various examples, field operations may be controlled to achieve desirable connectivity between subsurface features and/or to assure that certain subsurface features remain distinct with respect to their ability to communicate fluid. For example, consider a scenario where multiple wells are to be in fluid communication and/or a scenario where multiple wells are not to be in fluid communication. As an example, short-circuiting wells and/or features may or may not be desirable. As an example, through real-time characterization of subsurface features using DAS data, short-circuiting may be controlled.

As an example, a framework can provide for characterization of one or more natural fractures, as may be part of a natural fracture network. In such an example, such a characterization can be utilized to help optimize one or more field operations, for example, consider optimization of further infill well placement and spacing to neighboring wells.

As an example, variability of well distance, geological background properties, natural fracture network characteristics, and operational conditions can be captured by computing a plethora of strain rate signatures at potential observation wells to generate a library of signatures (e.g., signatures for multiple realizations). In such an example, the library of signatures generated from complex full-physics simulations can then be utilized as training data for one or more machine learning (ML) based pattern recognition techniques. For example, one or more ML models may be trained using information in a library to generate one or more trained ML models. In such an example, a trained ML model may take sensed information as input and output a realization or a ranking of realizations based on pattern matching. As an example, a ML model-based approach may be utilized in real-time during field operations where sensed information is input and one or more realizations output (e.g., based on pattern recognition, etc.). In such an example, a field operation or field operations may be adapted in real-time using a hydraulic fracturing framework (e.g., a hydraulic fracturing assessment application, etc.) where livestreamed strain recordings from observation wells can be translated rapidly into an understanding of the fracture development in the subsurface.

Figure 16:
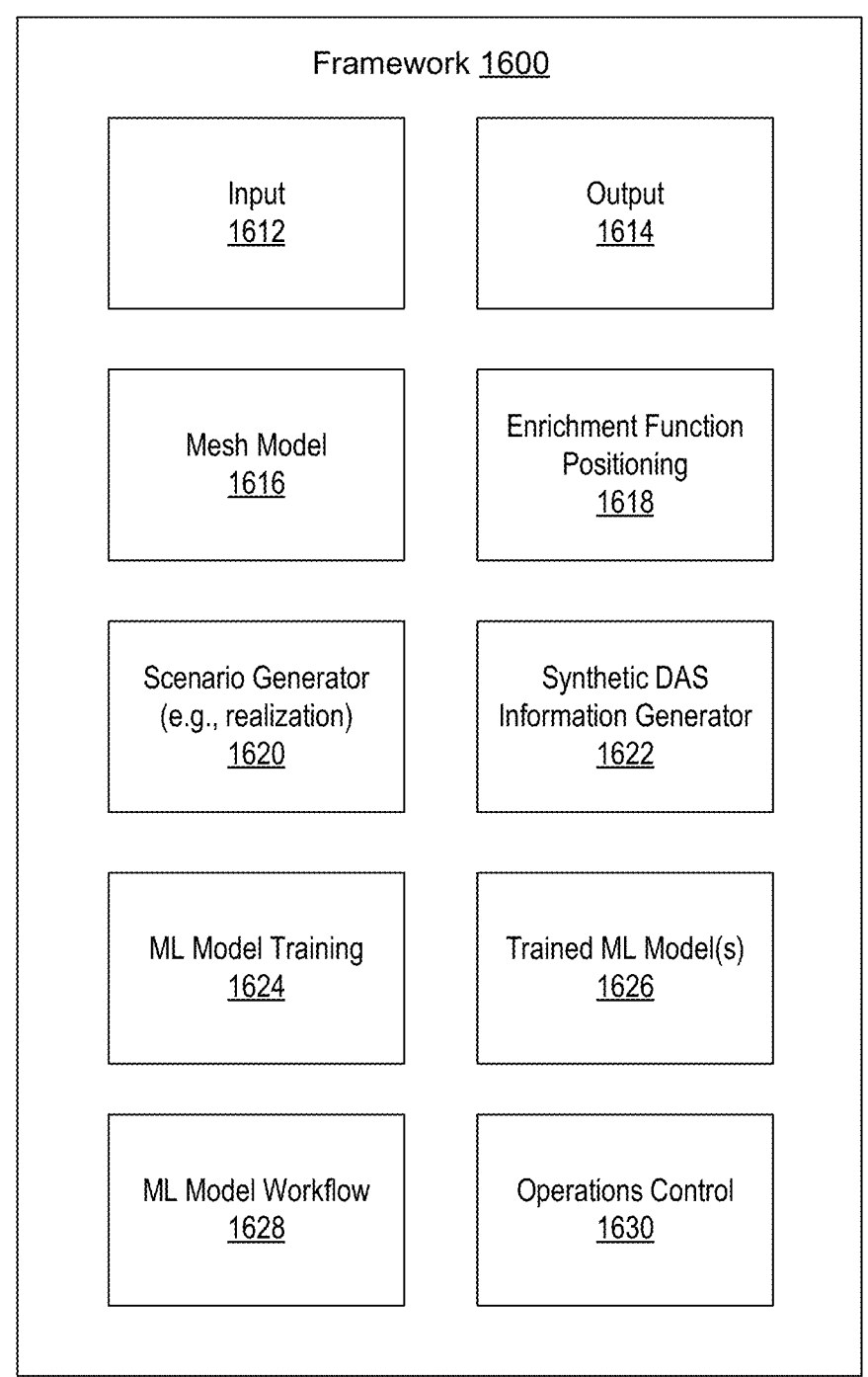
FIG. 16 illustrates an example of a framework.

FIG. 16 shows an example of a framework 1600 that can be a hydraulic fracturing framework. As shown, the framework 1600 can include an input component 1612 and an output component 1614, which may, for example, operate via one or more network interfaces. As an example, one or more application programming interfaces (APIs) may be utilized where the input component 1612 can receive an API call and where the output component 1614 can respond to the API call. As shown, the framework 1600 can include a mesh model component 1616, an enrichment function positioning component 1618, a scenario generator component 1620 (e.g., for generation of realizations, etc.), a synthetic DAS information generator component 1622, a ML model training component 1624, a trained ML model(s) component 1626, a ML model workflow component 1628 and an operations control component 1630. As an example, the ML model training component 1624 may be integral or part of a ML framework that the framework 1600 may utilize (e.g., via API calls, etc.). As an example, the framework 1600 can include features for building one or more workflows, for example, via the ML model workflow component 1628.

As an example, output from a trained ML model (see, e.g., the component 1626) may be assessed via the operations control component 1630, which may provide output for output via the output component 1614, which may be directed to one or more pieces of equipment. In such an example, the framework 1600 may be integrated into one or more control loops. As explained, a framework may provide output during a stage of hydraulic fracturing and/or between stages of hydraulic fracturing. As explained, such output may include one or more control signals, for example, to adjust one or more hydraulic fracturing operations.

As to types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, backpropagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a device may utilize TENSORFLOW LITE (TFL) or another type of lightweight framework. TFL is a set of tools that enables on-device machine learning where models may run on mobile, embedded, and IoT devices. TFL is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). Multiple platform support, covering ANDROID and iOS devices, embedded LINUX, and microcontrollers. Diverse language support, which includes JAVA, SWIFT, Objective-C, C++, and PYTHON. High performance, with hardware acceleration and model optimization. Machine learning tasks may include, for example, image classification, object detection, pose estimation, question answering, text classification, etc., on multiple platforms.

As an example, a TFL approach may be implemented using field equipment. For example, consider a DAS system that can be operatively coupled to and/or that can include a TFL framework that can operate in real-time and/or near real-time in the field during a hydraulic fracturing operation and/or between stages of hydraulic fracturing operations. In such an example, one or more parameters of hydraulic fracturing may be controlled, for example, to generate one or more hydraulic fractures of particular character (e.g., shape, size, width, orientation, etc.).

FIG. 17 shows an example of a method 1700 and an example of a system 1790. As shown, the method 1700 can include a reception block 1710 for receiving strain data associated with propagation of a hydraulic fracture in a subsurface geologic region; a performance block 1720 for performing a comparison between the strain data and simulation results generated using a mesh model of the subsurface geologic region and enrichment equations that represent one or more discontinuities in the subsurface geologic region; and a characterization block 1730 for, based on the comparison, characterizing the subsurface geologic region.

The method 1700 is shown in FIG. 17 in association with various computer-readable media (CRM) blocks 1711, 1721 and 1731. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1700. As an example, a computer-readable medium (CRM) may be a computer-readable storage medium that is non-transitory and that is not a carrier wave. As an example, one or more of the blocks 1711, 1721 and 1731 may be in the form processor-executable instructions.

In the example of FIG. 17, the system 1790 includes one or more information storage devices 1791, one or more computers 1792, one or more networks 1795 and instructions 1796. As to the one or more computers 1792, each computer may include one or more processors (e.g., or processing cores) 1793 and memory 1794 for storing the instructions 1796, for example, executable by at least one of the one or more processors 1793 (see, e.g., the blocks 1711, 1721 and 1731). As an example, a computer may include one or more network interfaces (e.g., wired or wireless), one or more graphics cards, a display interface (e.g., wired or wireless), etc.

Figure 18:
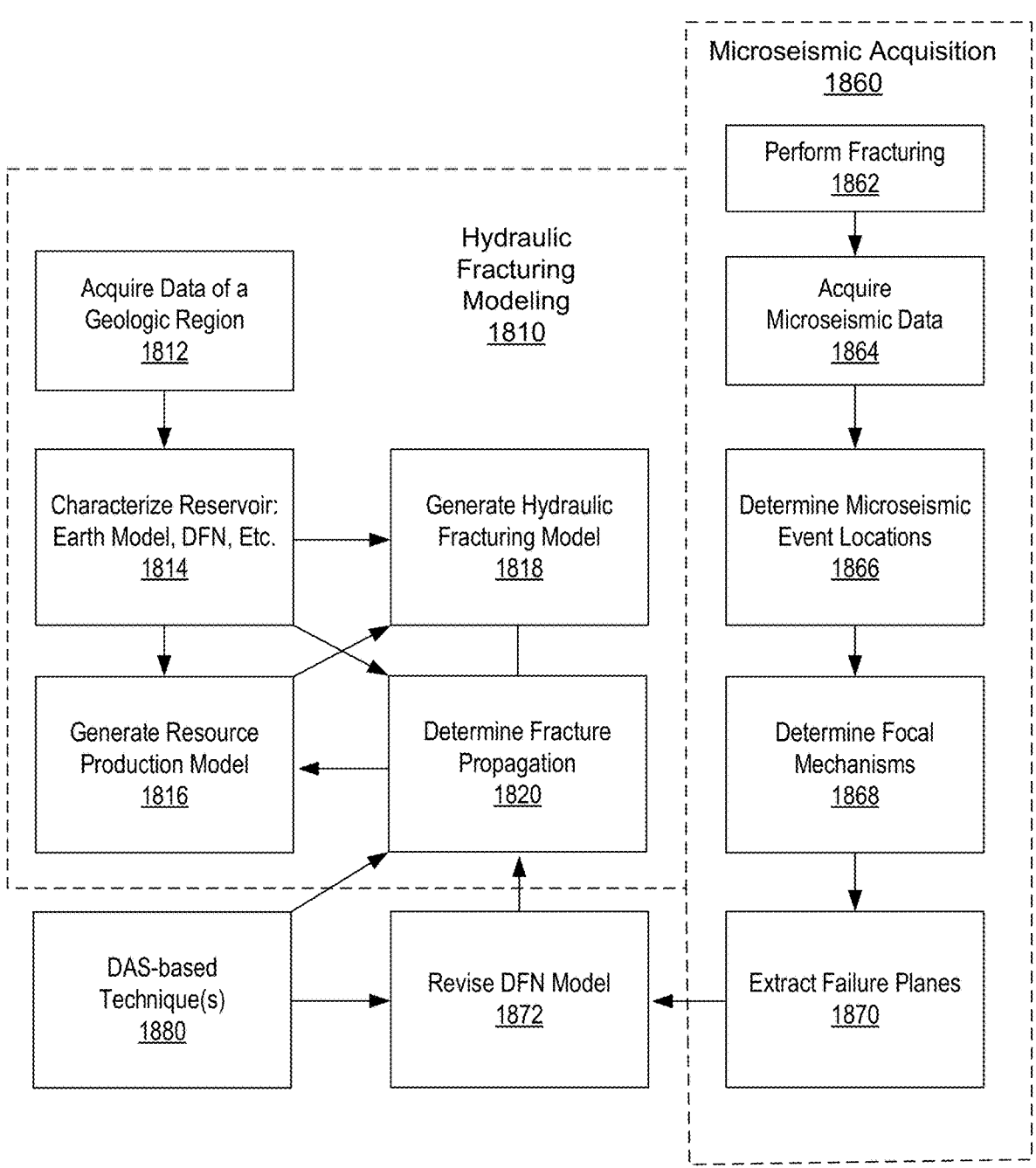
FIG. 18 illustrates an example of a method.

FIG. 18 shows an example of a method 1800 that includes hydraulic fracturing modeling 1810, microseismic data acquisition 1860 and a DAS techniques block 1880 for one or more techniques associated with DAS acquisition. For example, the block 1880 may utilize one or more methods, frameworks, etc., for one or more purposes, which can be for hydraulic fracturing modeling 1810 and/or for microseismic acquisition. As an example, the framework 1600 may be utilized as part of a DAS-based technique.

As mentioned, DAS may be utilized for one or more purposes. For example, consider low-frequency DAS (LF-DAS) and DAS microseismic where microseismic analysis may make use of frequencies between approximately 10 Hz and approximately 500 Hz and where LF-DAS (e.g., for DAS-SF, etc.) may make use of lower frequencies (e.g., less than approximately 1 Hz). As an example, the method 1800 may utilize a common DAS system and/or different DAS systems for acquisition of signals of different frequencies for one or more purposes, which may include one or more of strain sensing and microseismic sensing.

As shown, the method 1800 includes an acquisition block 1812 for acquiring data of a geologic region, a characterization block 1814 for characterizing a reservoir in the geologic region via a 3D earth model and a discrete fracture network (DFN) and optionally one or more other actions, a generation block 1816 for generating a resource production model of the geologic region, a generation block 1818 for generating a hydraulic fracturing model and a determination block 1820 for determining information associated with fracture propagation in the geologic region. As shown, the method 1800 includes a performance block 1862 for performing hydraulic fracturing in the geologic region, an acquisition block 1864 for acquiring microseismic data responsive to generation and/or reactivation of fractures in the geologic region (e.g., noting that DAS acquisition may be performed), a determination block 1866 for determining microseismic event locations in the geologic region, a determination block 1868 for determining one or more focal mechanisms based at least in part on the microseismic event locations, and an extraction block 1870 for extracting one or more failure planes based at least in part on the determined one or more focal mechanisms in the geologic region. Also shown, is a revision block 1872 for revising the DFN model that characterizes the reservoir where, as shown, the revised DFN model can be utilized to inform the determination block 1820 as to fracture propagation in the geologic region noting that one or more loops can exist within the method 1800 that can be performed responsive to fracturing and data acquisition, which can inform, for example, one or more operations in the geologic region (e.g., further fracturing, further data acquisition, production, etc.). As indicated, one or more DAS-based techniques may be utilized per the block 1880 for revising a DFN model. In the example of FIG. 18, the determination block 1820 may utilize a mesh and one or more sets of enrichment equations (e.g., enrichment functions, etc.) for representing one or more discontinuities.

Mechanical earth models (e.g., 3D earth models, etc.) can be generated from a variety of geologic, petrophysical, geomechanical, and geophysical information, which characterizes complexity and heterogeneity of a reservoir and completion properties in one or more formations of interest (see, e.g., the block 1814). As an example, data can be acquired via one or more of 3D seismic surveys, acoustic impedance (AI) and other seismic-derived property volumes (e.g., bulk modulus, Poisson's ratio, etc.), microseismic surveys, sonic logs, rock cores, burial history, petrophysical measurements from well logs, etc. (see, e.g., the block 1812). As an example, natural fracture patterns and regional stress field may be mapped using such multi-domain, multi-scale information as borehole images and 2D and 3D seismic surveys, which can then be used to develop and calibrate fracture propagation models (see, e.g., the block 1820). As an example, a mechanical earth model may be used to generate maps to assess, perform, etc., one or more of drilling, fracturing, and operational risks. As explained with respect to FIG. 18, the method 1800 can include integrating hydraulic fracturing models (see, e.g., the block 1818) developed through integration of geologic and structural models with production simulation models and risk maps (see, e.g., the block 1816), which can provide for decision making for completion operations, execution of an optimum stimulation plan, etc.

As an example, hydraulic fracturing models developed through the integration of geologic and structural reservoir characterization models, fracture propagation models and production models may be utilized in evaluating different unconventional completion operations. For example, consider operations that include real-time microseismic data acquisition for evaluating performance of hydraulic fracturing stimulations and in providing information about for calibrating and developing revised fracture models for one or more of ongoing and future stimulations.

Microseismic monitoring can be used to evaluate hydraulic fracture treatments in real-time and can be utilized in planning and managing reservoir development. Microseismic event locations, source characteristics and attributes provide can provide estimates of hydraulic fracturing geometry that can be evaluated with respect to a completion plan and expected fracture growth. Microseismic event derived attributes such as fracture azimuth, height and length, location and complexity, may be utilized to determine the extent of fracture coverage of the reservoir target and effective stimulated volume, as well as in diagnosing under-stimulated sections of the reservoir and in planning re-stimulation of under-producing perforations and wells. Microseismic event locations can also help to avoid hazards during stimulation (e.g. faults, karst, aquifers, etc.). As an example, a method can include modifications to one or more treatment plans and operations based at least in part on microseismic interpretations.

As an example, microseismic monitoring results may be used in updating and calibrating geologic and structural models used in planning completions. Information about the inelastic deformation of the fracture source (fracture plane orientation and slip) that generates the microseismic signal may be, for example, obtained through moment tensor inversion. The moment tensor can describe various source types (e.g. explosion, tensile crack opening or closing, slip on a plane or combination thereof). As hydraulic fracture microseismicity can be a result of high-pressure injection of fluids and proppant to open fracture paths, moment tensor inversion can be used to determine fracture opening and closing events from shear displacements, providing valuable information to engineers as to whether their fractures pathways are open or closed. Moment tensors may also provide a direct measurement of the local stress-strain regime, fracture orientations, and changes to the local stresses and fracture orientation through time that can be used to develop and calibrate discrete fracture network (DFN) models.

As an example, a framework may be utilized in one or more types of field operations that involve fracturing. While various examples may involve fracturing to increase production of hydrocarbons, as an example, a framework may be implemented to improve field operations for production of geothermal energy. As mentioned, various features of the VISAGE framework may be utilized in a geothermal energy workflow (e.g., thermal recovery, etc.).

As an example, geothermal energy may be extracted from a subsurface region through injection of water in an injection well and production of steam via one or more production wells where, for example, the produced steam may be utilized to drive one or more turbines (e.g., consider generation of electricity using one or more steam driven turbines). As an example, to confront risks that may occur during geothermal energy extraction, field operations may utilize an arrangement of production wells disposed around one or more injection wells, which may be referred to as fracture caging (e.g., to "cage" injected fluid in a limited volume of fractured rock). Such an approach may help to reduce risks of undesirable stimulation of fractures that may lead to undesirable fluid communication, undesirable seismic events, etc. For example, a framework may be implemented in a fracture caging workflow to improve containment of injected fluid and/or limit induced seismicity.

As an example, a framework may improve fracture caging by characterizing subsurface structures based on DAS data such that fracture growth may be more suitably hindered by production wells and/or one or more leaky fracture networks. As explained, fracture flow in a geothermal scenario may be contained using a cage of production wells around an injection well. In such a scenario, DAS data may be acquired in the production wells to characterize growth of one or more fractures stemming from fluid injected via the injection well. As explained, a framework may utilize DAS data to characterize a subsurface environment and hence provide clarity as to features therein, which may be relevant to fracturing (e.g., fracture growth, etc.). As an example, a caging operation may aim to induce a closed-loop flow inside one or more leaky fracture-dominated flow-networks. As explained, a framework may effectively provide headlights to illuminate (e.g., characterize) one or more subsurface features germane to one or more subsurface fluid networks. In such an approach, field operations for fracture caging may be controlled to achieve desirable fluid flow, reduce risk of undesirable fluid flow, and/or reduce seismic risk as such factors can be sensitive to subsurface features, which may depend on rock heterogeneity, anisotropy, etc.

Integrated workflows leveraging multi-scale, multi-domain measurements and one or more types of data (e.g., DAS, microseismic, etc.) can enable optimization of hydraulic fracturing treatment for increased production. These integrated workflows may use a wide variety of information about the geology (e.g., lithology, stress contrast, natural fracturing, structural or depositional dip, faulting), and the associated rock properties, (e.g., noise, slowness, anisotropy, attenuation) to improve hydraulic fracturing operations to lead to improved hydraulic fracture stimulations, completion plans, and well placement and, thereby, improved production.

As an example, a method can include receiving strain data associated with propagation of a hydraulic fracture in a subsurface geologic region; performing a comparison between the strain data and simulation results generated using a mesh model of the subsurface geologic region and enrichment equations that represent one or more discontinuities in the subsurface geologic region; and, based on the comparison, characterizing the subsurface geologic region. In such an example, strain data can include distributed acoustic sensing data.

As an example, strain data can include strain data acquired using a cable in an observation well and where a hydraulic fracture propagates outwardly from a stimulation well. In such an example, the observation well can be offset from the stimulation well and, for example, substantially parallel to the stimulation well (e.g., consider within +/−20 degrees).

As an example, enrichment equations can be used to represent a propagating hydraulic fracture as one of one or more discontinuities.

As an example, a mesh model can include a discrete fracture network that includes at least one natural fracture.

As an example, enrichment equations can represent natural fractures in a subsurface geologic region as a number of one or more discontinuities.

As an example, a method can include performing a comparison that includes comparing strain data and simulation results with respect to time. In such an example, the strain data can change with respect to time due a propagating hydraulic fracture and due to orientation of at least one of one or more discontinuities.

As an example, strain data can depend on orientation of at least one natural fracture in a subsurface geologic region.

As an example, a method can include performing a comparison by using a trained machine learning model, where the trained machine learning model is trained using the simulation results.

As an example, a method can include performing a comparison that includes matching a pattern of strain data to a pattern of simulation results. In such an example, the strain data may be acquired in an observation well where the simulation results can use a model that includes a representation of the observation well or an area for the observation well such that the simulation results can simulate what sensors in the observation well may actually sense (e.g., experience in terms of strain). As an example, an observation well may be modeled using a mesh and/or equations. As an example, an observation well may be modeled according to one or more characteristics such as cement, casing, position of a cable (e.g., a DAS fiber cable, etc.). While representing an observation well for DAS is mentioned, a method can include representing an observation well for microseismic acquisition.

As an example, a method can include characterizing where characterizing includes determining an orientation of at least one of the one or more discontinuities.

As an example, a propagating hydraulic fracture can propagate outwardly from a stimulation well and a characterizing technique can include determining an angle of at least one natural fracture with respect to a longitudinal axis of the stimulation well. As explained, in various instances, a natural fracture may act as a type of element such as a reflector that can alter strain with respect to time during hydraulic fracturing.

As an example, a method can include, based at least in part on characterizing a subsurface geologic region, controlling a hydraulic fracturing operation. In such an example, propagation of a hydraulic fracture can occur responsive to performing the hydraulic fracturing operation.

As an example, a method can include, based at least in part on characterizing a subsurface geologic region, planning a hydraulic fracturing operation for propagation of another hydraulic fracture.

As an example, a system can include a processor; a memory operatively coupled to the processor; processor-executable instructions stored in the memory and executable to instruct the system to: receive strain data associated with propagation of a hydraulic fracture in a subsurface geologic region; perform a comparison between the strain data and simulation results generated using a mesh model of the subsurface geologic region and enrichment equations that represent one or more discontinuities in the subsurface geologic region; and, based on the comparison, characterize the subsurface geologic region.

As an example, one or more computer-readable storage media can include processor-executable instructions executable by a system to instruct the system to: receive strain data associated with propagation of a hydraulic fracture in a subsurface geologic region; perform a comparison between the strain data and simulation results generated using a mesh model of the subsurface geologic region and enrichment equations that represent one or more discontinuities in the subsurface geologic region; and, based on the comparison, characterize the subsurface geologic region.

As an example, a computer program product can include one or more computer-readable storage media that can include processor-executable instructions to instruct a computing system to perform one or more methods and/or one or more portions of a method.

Figure 19:
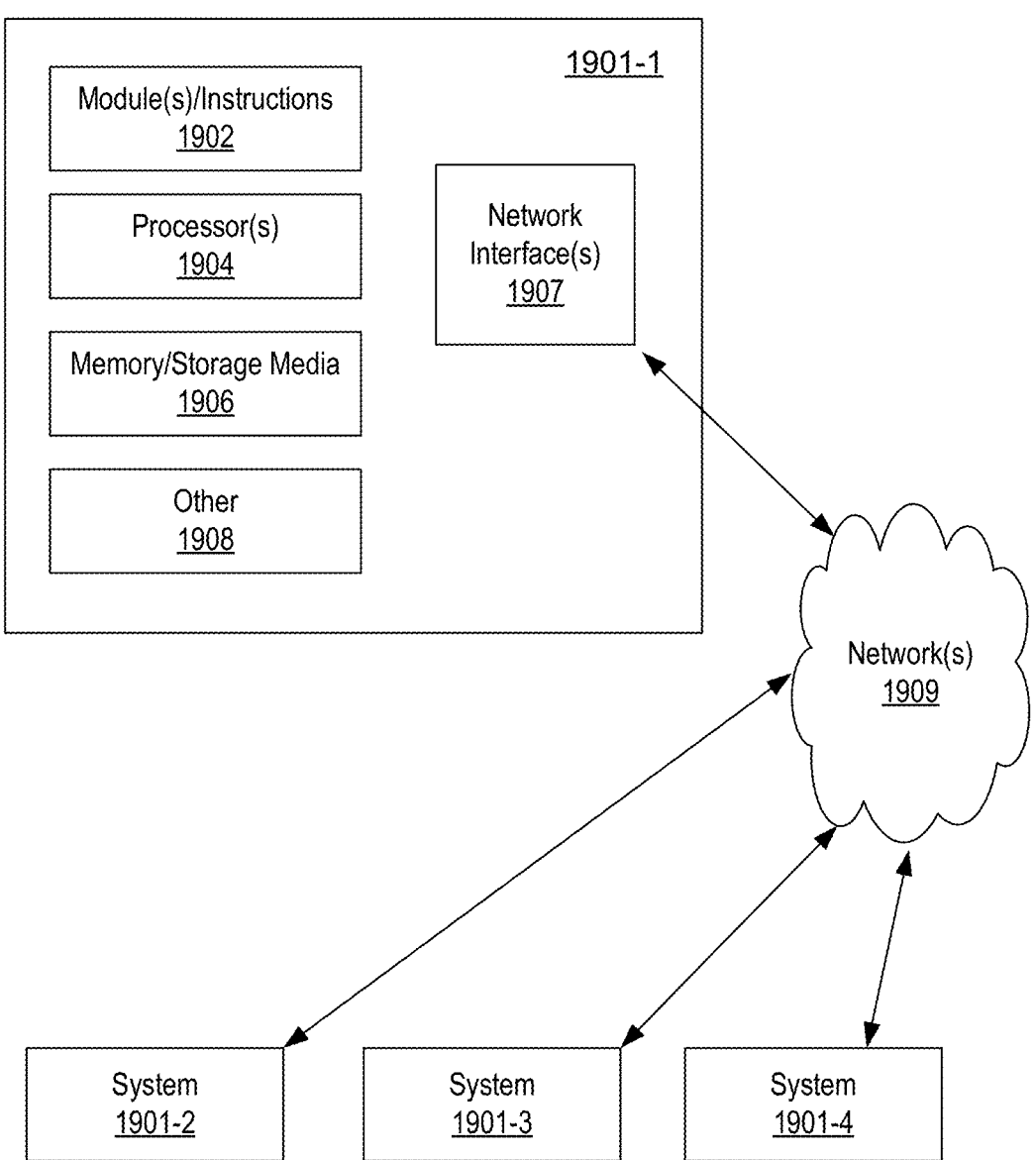
FIG. 19 illustrates example components of a system and a networked system.

In some embodiments, a method or methods may be executed by a computing system. FIG. 19 shows an example of a system 1900 that can include one or more computing systems 1901-1, 1901-2, 1901-3 and 1901-4, which may be operatively coupled via one or more networks 1909, which may include wired and/or wireless networks.

As an example, a system can include an individual computer system or an arrangement of distributed computer systems. In the example of FIG. 19, the computer system 1901-1 can include one or more modules 1902, which may be or include processor-executable instructions, for example, executable to perform various tasks (e.g., receiving information, requesting information, processing information, simulation, outputting information, etc.).

As an example, a module may be executed independently, or in coordination with, one or more processors 1904, which is (or are) operatively coupled to one or more storage media 1906 (e.g., via wire, wirelessly, etc.). As an example, one or more of the one or more processors 1904 can be operatively coupled to at least one of one or more network interfaces 1907; noting that one or more other components 1908 may also be included. In such an example, the computer system 1901-1 can transmit and/or receive information, for example, via the one or more networks 1909 (e.g., consider one or more of the Internet, a private network, a cellular network, a satellite network, etc.).

As an example, the computer system 1901-1 may receive from and/or transmit information to one or more other devices, which may be or include, for example, one or more of the computer systems 1901-2, etc. A device may be located in a physical location that differs from that of the computer system 1901-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1906 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EE-PROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution. As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
disposing a distributed acoustic sensing (DAS) system in an observation well;
generating a mesh model of a fracture network including preexisting natural fractures in a subsurface geologic region based on geological data acquired by the DAS system;
performing a first stimulation operation from a stimulation well with a perforator at a first position in the stimulation well to cause a first propagation of a first hydraulic fracture in the subsurface geologic region toward the observation well;
recording a DAS signature via the DAS system in the observation well in real-time with the first propagation of the first hydraulic fracture;
performing, via a modeling framework, a comparison between the geological data and simulation results generated using the mesh model of the subsurface geologic region and enrichment equations that represent discontinuities in the subsurface geologic region, wherein the performing the comparison comprises utilizing the modeling framework comprising a forward model and an inversion model, the inversion model configured to:
compute a strain rate signature at the observation well as impacted by distances and orientations of the preexisting natural fractures;
create first templates for the strain rate signature as impacted by the distances;

create second templates for the strain rate signature as impacted by the orientations; and
combine the first templates and the second templates to describe combinations of strain rate signatures for arbitrary distances and arbitrary orientations of the preexisting natural fractures; and
inferring updated orientations, distances, and densities of the preexisting natural fractures from the inversion model;
characterizing the subsurface geologic region by updating the mesh model based on the inferring;
moving the perforator to a second position in the stimulation well based on the updating the mesh model; and
performing a second stimulation operation via the perforator in the second position in the stimulation well to cause a second propagation of a second hydraulic fracture that short circuits the stimulation well and a neighboring well.

2. The method of claim 1, wherein the geological data comprise strain data acquired using a cable in the observation well.

3. The method of claim 2, wherein the observation well is offset from the stimulation well.

4. The method of claim 3, wherein the observation well is substantially parallel to the stimulation well.

5. The method of claim 1, wherein the enrichment equations represent the first propagation of the first hydraulic fracture as one of the discontinuities.

6. The method of claim 1, wherein the enrichment equations represent natural fractures in the subsurface geologic region as a number of the discontinuities.

7. The method of claim 1, wherein performing the comparison compares the geological data and the simulation results with respect to time.

8. The method of claim 7, wherein the geological data change with respect to time due to the first propagation of the first hydraulic fracture and due to orientation of at least one of the discontinuities.

9. The method of claim 1, wherein the geological data depend on orientation of at least one natural fracture in the subsurface geologic region.

10. The method of claim 1, wherein performing the comparison comprises using a trained machine learning model, wherein the trained machine learning model is trained using the simulation results.

11. The method of claim 1, wherein performing the comparison comprises matching a pattern of the geological data to a pattern of the simulation results.

12. The method of claim 1, wherein the characterizing comprises determining an orientation of at least one of the discontinuities.

13. The method of claim 1, wherein the first propagation of the first hydraulic fracture propagates outwardly from the stimulation well, and wherein the characterizing comprises determining an angle of at least one natural fracture with respect to a longitudinal axis of the stimulation well.

14. The method of claim 1, comprising, based at least in part on the characterizing the subsurface geologic region, controlling a hydraulic fracturing operation.

15. The method of claim 14, wherein the first propagation of the first hydraulic fracture occurs responsive to performing the hydraulic fracturing operation.

16. The method of claim 1, comprising, based at least in part on the characterizing the subsurface geologic region, planning a hydraulic fracturing operation for propagation of another hydraulic fracture.

17. The method of claim 1, further comprising:

generating a stimulation operations roadmap in real-time with the performing the comparison between the geological data and the simulation results; and the performing the second stimulation operation is based on the stimulation operations roadmap.

18. The method of claim 1, wherein the forward model is configured to model an effect of the preexisting natural fractures on a low-frequency DAS signature recorded via the DAS system in the observation well.

19. A system comprising:

a processor;

a memory operatively coupled to the processor;

processor-executable instructions stored in the memory and executable to instruct the system to:

dispose a distributed acoustic sensing (DAS) system in an observation well;

generate a mesh model of a fracture network including preexisting natural fractures in a subsurface geologic region based on geological data acquired by the DAS system;

perform a first stimulation operation from a stimulation well with a perforator at a first position in the stimulation well to cause a first propagation of a first hydraulic fracture in the subsurface geologic region toward the observation well;

record a DAS signature via the DAS system in the observation well in real-time with the first propagation of the first hydraulic fracture;

perform, via a modeling framework, a comparison between the geological data and the simulation results generated using the mesh model of the subsurface geologic region and enrichment equations that represent discontinuities in the subsurface geologic region, wherein the performing the comparison comprises utilizing the modeling framework comprising a forward model and an inversion model, the inversion model configured to:

compute a strain rate signature at the observation well as impacted by distances and orientations of the preexisting natural fractures;

create first templates for the strain rate signature as impacted by the distances;

create second templates for the strain rate signature as impacted by the orientations; and combine the first templates and the second templates to describe combinations of strain rate signatures for arbitrary distances and arbitrary orientations of the preexisting natural fractures; and infer updated orientations, distances, and densities of the preexisting natural fractures from the inversion model;

characterize the subsurface geologic region by updating the mesh model based on the inferring;

move the perforator to a second position in the stimulation well based on the updating the mesh model; and perform a second stimulation operation via the perforator in the second position in the stimulation well to cause a second propagation of a second hydraulic fracture that short circuits the stimulation well and a neighboring well.

20. One or more non-transitory computer-readable storage media comprising processor-executable instructions executable by a system to instruct the system to:

dispose a distributed acoustic sensing (DAS) system in an observation well;

generate a mesh model of a fracture network including preexisting natural fractures in a subsurface geologic region based on geological data acquired by the DAS system;

perform a first stimulation operation from a stimulation well with a perforator at a first position in the stimulation well to cause a first propagation of a first hydraulic fracture in the subsurface geologic region toward the observation well;

record a DAS signature via the DAS system in the observation well in real-time with the first propagation of the first hydraulic fracture;

perform, via a modeling framework, a comparison between the geological data and simulation results generated using the mesh model of the subsurface geologic region and enrichment equations that represent discontinuities in the subsurface geologic region, wherein the performing the comparison comprises utilizing the modeling framework comprising a forward model and an inversion model, wherein the forward model is configured to model an effect of the preexisting natural fractures on a low-frequency DAS signature recorded via the DAS system in the observation well and wherein the inversion model is configured to:

compute a strain rate signature at the observation well as impacted by distances and orientations of the preexisting natural fractures;

create first templates for the strain rate signature as impacted by the distances;

create second templates for the strain rate signature as impacted by the orientations; and combine the first templates and the second templates to describe combinations of strain rate signatures for arbitrary distances and arbitrary orientations of the preexisting natural fractures;

infer updated orientations, distances, and densities of the preexisting natural fractures from the inversion model;

characterize the subsurface geologic region by updating the mesh model based on the inferring;

move the perforator to a second position in the stimulation well based on the updating the mesh model;

perform a second stimulation operation via the perforator in the second position in the stimulation well to cause a second propagation of a second hydraulic fracture that short circuits the stimulation well and a neighboring well;

generate a stimulation operations roadmap in real-time with the performing the comparison between the geological data and the simulation results; and the performing the second stimulation operation is based on the stimulation operations roadmap.

* * * * *